United States Patent [19]
Kakizawa et al.

[11] Patent Number: 6,110,578
[45] Date of Patent: Aug. 29, 2000

[54] EXPANDED MATERIAL AND LAMINATE

[75] Inventors: Yasutoshi Kakizawa; Toshiki Shikata, both of Chiba, Japan

[73] Assignee: Dainippon Ink and Chemicals, Inc., Tokyo, Japan

[21] Appl. No.: 09/482,111

[22] Filed: Jan. 13, 2000

Related U.S. Application Data

[62] Division of application No. 08/753,493, Nov. 26, 1996, Pat. No. 6,037,384.

[30] Foreign Application Priority Data

| Nov. 28, 1995 | [JP] | Japan | 7-309011 |
| Dec. 7, 1995 | [JP] | Japan | 7-319005 |
| Jan. 26, 1996 | [JP] | Japan | 8-011782 |

[51] Int. Cl.$^7$ .................................................. B32B 3/26
[52] U.S. Cl. ........................ 428/318.6; 521/187; 528/361
[58] Field of Search ........................ 428/318.6; 521/182; 528/361

[56] References Cited

U.S. PATENT DOCUMENTS 5,314,927  5/1994  Kondo et al. .
5,321,052  6/1994  Taka et al. .
5,362,765  11/1994  Taka et al. .
5,661,193  8/1997  Khemani .

*Primary Examiner*—Morton Foelak
*Attorney, Agent, or Firm*—Armstrong, Westerman, Hattori, McLeland & Naughton

[57] ABSTRACT

The present invention provides a biodegradable expanded material having excellent expandability, moldability, impact resistance, heat resistance and storage stability. The present invention also provides a process for the preparation of the foregoing expanded material. The present invention further provides a laminate of a non-expanded material layer and an expanded material layer prepared from the foregoing expanded material which exhibits excellent impact resistance and heat resistance and an excellent transparency in the non-expanded material even after heat treatment so that a pattern printed on the inner side of the non-expanded material layer can be clearly viewed from the outside. A novel expanded material is provided made of a hydroxycarboxylic acid based polyester having a weight-average molecular weight of from 20,000 to 400,000 comprising as structural units a structural unit derived from hydroxycarboxylic acid, a structural unit derived from molecular weight increasing agent and/or a structural unit derived from polymerization catalyst deactivator.

14 Claims, No Drawings

EXPANDED MATERIAL AND LAMINATE

This application is a division of prior application Ser. No. 08/753,493, filed Nov. 26, 1996, U.S. Pat. No. 6,037,384.

FIELD OF THE INVENTION

The present invention relates to a formable and biodegradable expanded material having excellent expandability, impact resistance and heat resistance made of a hydroxycarboxylic acid based polyester comprising as structural units a hydroxycarboxylic acid component, a structural unit derived from molecular weight increasing agent and/or a polymerization catalyst deactivator component or a hydroxycarboxylic acid based polyester comprising as structural units a hydroxycarboxylic acid component, a structural unit derived from molecular weight increasing agent and/or a polymerization catalyst deactivator, a structural unit derived from dicarboxylic acid and a structural unit derived from diol, a process for the preparation of said expanded material, and a laminate prepared from said expanded material.

The expanded material obtained according to the present invention may be used as it is. Alternatively, the expanded material of the present invention may be subjected to secondary processing such as cutting, punching, pressure forming and vacuum forming so that it can be used in the art of insulating material such as agricultural and marine product box and dewproof sheet, building material such as panel and synthetic timber, food packaging material such as food tray, lunch box, food container and drink cup and packaging cushioning for appliance, precision machine and toy.

The present invention further relates to a laminate prepared from the expanded material obtained according to the present invention having excellent impact resistance, heat resistance and biodegradability and comprising a non-expanded material layer having an excellent transparency which can be formed by matched-mold vacuum forming or the like and can be used as a food tray, lunch box, packaging cushioning, swimming exerciser and seeding pot.

BACKGROUND OF THE INVENTION

Examples of expanded material made of plastics, particularly expanded materials prepared by an extruder, which have recently been marketed include polystyrene foam, polyethylene foam, and polypropylene foam. These expanded materials have found wide application in many fields because of their light weight, excellent insulation characteristics, excellent acoustic insulation characteristics and excellent cushioning properties as well as excellent moldability. On the other hand, these expanded materials are bulky and can be little decomposed in natural environment. Thus, these expanded materials accumulate in the natural world to cause the shortage of places to be reclaimed, pollute soil, rivers and ocean, raising a great social problem. As a countermeasure of inhibiting the environmental pollution there has been keenly desired the development of biodegradable polymers which can decompose with microorganisms in the soil and water and then get into a material chain system in natural environment to inhibit the environmental pollution.

Studies have been made of research and development of biodegradable polymers. For example, expanded materials of lactic acid based polymer such as polylactic acid and copolymer of lactic acid with hydroxycarboxylic acid other than lactic acid, polysaccharide such as corn starch and natural substance mainly composed of derivative thereof are the target of studies.

For the details of expanded materials of polysaccharide based natural substance, reference can be made to JP-A-5-39377 (The term "JP-A" as used herein means an "unexamined published Japanese patent application"). However, the expanded materials disclosed in the above cited patent are disadvantageous in that they have a reduced surface smoothness and a deteriorated water resistance, restricting their use.

Lactic acid based polymers can be used with safety. As living body-absorbing polymers, they have been used as suture, bone internal fixation material, DDS (drug delivery system), etc. Further, since the lactic acid based polymers give a low combustion calorie when combusted, their development and use as polymers harmless to environment have been extensively studied in recent years.

Lactic acid based polymer expanded materials are disclosed in JP-A-4-304244, JP-A-5-140361, JP-A-6-287347, and JP-B-5-508669 (The term "JP-B" as used herein means an "examined Japanese patent publication"). These patents relate to expanded materials obtained by the extrusion of a lactic acid based polyester such as polylactic acid and copolymer of lactic acid with $\epsilon$-caprolactone through an extruder.

These polylactic acid expanded materials have an excellent biodegradability and a high hardness but are disadvantageous in that they are brittle and weak against impact. Further, the copolymer of lactic acid with $\epsilon$-caprolactone is relatively flexible but is disadvantageous in that it has a low heat resistance. Moreover, these lactic acid based polyesters generally have a great content of residual volatile matter, particularly residual lactide. Therefore, these lactic acid based polyesters are subject to thermal deterioration upon forming. Further, these lactic acid based polyesters tend to have a lower molecular weight and a lower viscosity, making it difficult to obtain an expanded material having a high expansion ratio. The resulting expanded materials have a reduced mechanical strength and a deteriorated heat resistance and storage stability. This is mainly because the residual lactide reacts with water in the air to produce an organic acid that causes the hydrolysis and breakage of polymer chains during forming.

A laminate of a lactic acid based polyester expanded material has been little reported. It is described as a formed product of lactic acid based polymer expanded material only in JP-A-6-287347, etc. However, if a L-polylactic acid is used as a surface non-expanded material described in the examples of the above cited patent, the resulting product has a reduced impact resistance. Further, if a blend of a poly-DL-lactic acid with a poly-L-lactic acid is used, the resulting product has a reduced heat resistance. If a copolymer of a poly-L-lactic acid with caprolactone is used, the resulting product has a deteriorated heat resistance and transparency.

Further, since the polymerization catalyst used in the preparation of these prior art lactic acid based polyester expanded materials is not deactivated after use, it then acts as a catalyst for decomposition reaction, lowering the molecular weight of the product during the preparation and forming of the laminate. Moreover, when the residual monomers are devolatilized away under reduced pressure while the polymer is melted, the molecular weight of the product is lowered, and monomers are produced from the polymer, eventually making the removal of monomers insufficient. As a result, the molecular weight of the laminate thus obtained is accelerately lowered by the action of an acid produced during storage, deteriorating the physical properties of the laminate in a short period of time.

SUMMARY OF THE INVENTION

It is therefore an object of the present invention to provide a biodegradable expanded material having excellent expandability, moldability, impact resistance, heat resistance and storage stability.

It is another object of the present invention to provide a process for the preparation of the foregoing expanded material.

It is a further object of the present invention to provide a laminate of a non-expanded material layer and an expanded material layer prepared from the foregoing expanded material which exhibits excellent impact resistance and heat resistance and an excellent transparency in the non-expanded material even after heat treatment so that a pattern printed on the inner side of the non-expanded material layer can be clearly viewed from the outside.

These and other objects of the present invention will become more apparent from the following detailed description and examples.

The inventors made extensive studies of the foregoing problems. As a result, it was found that a hydroxycarboxylic acid based polyester comprising as structural units a hydroxycarboxylic acid component, a structural unit derived from molecular weight increasing agent and/or a polymerization catalyst deactivator component or a hydroxycarboxylic acid based polyester comprising as structural units a hydroxycarboxylic acid component, a structural unit derived from molecular weight increasing agent and/or a polymerization catalyst deactivator component, a structural unit derived from dicarboxylic acid, and a structural unit derived from diol is excellent in thermal stability and storage stability. On the basis of this knowledge, the inventors obtained a biodegradable hydroxycarboxylic acid based polyester expanded material having excellent expandability, impact resistance, heat resistance and storage stability by adding a nucleating agent, a blowing agent, etc. to the hydroxycarboxylic acid based polyester. Thus, the present invention has been worked out.

The first aspect of the present invention is an expanded material made of a hydroxycarboxylic acid based polyester having a weight-average molecular weight of from 20,000 to 400,000 comprising as structural units a structural unit derived from hydroxycarboxylic acid, a structural unit derived from molecular weight increasing agent and/or a structural unit derived from polymerization catalyst deactivator.

The second aspect of the present invention is an expanded material made of a hydroxycarboxylic acid based polyester having a weight-average molecular weight of from 20,000 to 400,000 comprising as structural units a structural unit derived from hydroxycarboxylic acid, a structural unit derived from molecular weight increasing agent and/or a structural unit derived from polymerization catalyst deactivator, a structural unit derived from dicarboxylic acid, and a structural unit derived from diol.

The third aspect of the present invention is an expanded material made of a hydroxycarboxylic acid based polyester as defined in the first or second aspect, wherein said structural unit derived from hydroxycarboxylic acid is one derived from lactic acid.

The fourth aspect of the present invention is an expanded material made of a hydroxycarboxylic acid based polyester as defined in any one of the foregoing aspects, wherein said structural unit derived from polymerization catalyst deactivator comprises a chelating agent and/or acidic phosphate component.

The fifth aspect of the present invention is a process for the preparation of a hydroxycarboxylic acid based polyester expanded material, which comprises subjecting a hydroxycarboxylic acid based polyester having a weight-average molecular weight of from 20,000 to 400,000 comprising as structural units a structural unit derived from hydroxycarboxylic acid, a structural unit derived from molecular weight increasing agent and/or a structural unit derived from polymerization catalyst deactivator to melting and blending with a nucleating agent and a blowing agent so that it is expanded.

The sixth aspect of the present invention is a process for the preparation of a hydroxycarboxylic acid based. polyester expanded material, comprising subjecting a hydroxycarboxylic acid based polyester having a weight-average molecular weight of from 20,000 to 400,000 comprising as structural units a structural unit derived from hydroxycarboxylic acid, a structural unit derived from molecular weight increasing agent and/or a structural unit derived from polymerization catalyst deactivator, a structural unit derived from dicarboxylic acid, and a structural unit derived from diol to melting and blending with a nucleating agent and a blowing agent so that it is expanded.

The seventh aspect of the present invention is a process for the preparation of a hydroxycarboxylic acid based polyester expanded material, which comprises subjecting a hydroxycarboxylic acid based polyester having a weight-average molecular weight of from 20,000 to 400,000 comprising as structural units a structural unit derived from hydroxycarboxylic acid, a structural unit derived from molecular weight increasing agent and/or a structural unit derived from polymerization catalyst deactivator and a polyester comprising as structural units a structural unit derived from dicarboxylic acid and a structural unit derived from diol to melting and blending with a nucleating agent and a blowing agent so that it is expanded.

The eighth aspect of the present invention is a process for the preparation of a hydroxycarboxylic acid based polyester expanded material as defined in any one of the fifth to seventh aspects, wherein said hydroxycarboxylic acid based polyester is free of volatile matter.

The ninth aspect of the present invention is a process for the preparation of a hydroxycarboxylic acid based polyester expanded material as defined in any one of the fifth to eighth aspects, wherein the surface of the expanded material which has been expanded is cooled during blowing.

The tenth aspect of the present invention is a process for the preparation of a hydroxycarboxylic acid based polyester expanded material as defined in any one of the fifth to ninth aspects, wherein said blowing agent is a hydrocarbon.

The eleventh aspect of the present invention is a laminate comprising an expanded material layer made of an expanded material as defined in any one of the first to fourth aspects and a biodegradable non-expanded material layer.

The twelfth aspect of the present invention is a laminate as defined in the eleventh aspect, wherein said non-expanded material layer is made of an expanded material as defined in any one of the first to fourth aspects.

The thirteenth aspect of the present invention is a laminate as defined in the eleventh aspect, wherein said non-expanded material layer is made of a lactic acid based polyester having a weight-average molecular weight of from 20,000 to 400,000 comprising from 40 to 95 parts by weight of a structural unit derived from lactic acid and from 5 to 60 parts by weight of a polyester structural unit derived from dicarboxylic acid and diol.

The fourteenth aspect of the present invention is a laminate as defined in the eleventh aspect, wherein said non-expanded material layer comprises a structural unit derived from lactic acid and a polyester structural unit derived from dicarboxylic acid and diol and a part or whole of said polyester structural unit derived from dicarboxylic acid and/or diol has a $C_{1-10}$ alkyl branched chain.

The fifteenth aspect of the present invention is a laminate as defined in any one of the eleventh to fourteenth aspects, wherein said non-expanded material layer is in the form of a crystal formed by heat treatment at a temperature of from not lower than its glass transition temperature to lower than its melting point.

DETAILED DESCRIPTION OF THE INVENTION

The present invention will be further described hereinafter.

The hydroxycarboxylic acid based polyester to be used in the present invention comprises as structural units a structural unit derived from hydroxycarboxylic acid, a structural unit derived from molecular weight increasing agent and/or a polymerization catalyst deactivator or comprises as structural units a structural unit derived from hydroxycarboxylic acid, a structural unit derived from molecular weight increasing agent and/or a polymerization catalyst deactivator, a structural unit derived from dicarboxylic acid, and a structural unit derived from diol.

The term "structural unit" as used herein is meant to indicate each constituent contained in the polymer, i.e., residue of each component constituting the polymer. In other words, the structural unit derived from hydroxycarboxylic acid means a hydroxycarboxylic acid residue. The structural unit derived from molecular weight increasing agent means a molecular weight increasing agent residue. The structural unit derived from polymerization catalyst deactivator means a polymerization catalyst deactivator residue. The structural unit derived from dicarboxylic acid means a dicarboxylic acid residue. The structural unit derived from diol means a diol residue. These structural units each form an essential constituent of the hydroxycarboxylic acid based polyester. The polymerization catalyst deactivator may be in the form of constituent of coordinate bond which is not a definite chemical bond, e.g., chelate.

The molecular weight increasing agent which has been added during the polymerization reaction of a hydroxycarboxylic acid (or cyclic ester thereof) for the production of a hydroxycarboxylic acid based polyester or during the polymerization reaction of a hydroxycarboxylic acid, a dicarboxylic acid and diol for the production of a hydroxycarboxylic acid based polyester and/or the polymerization catalyst deactivator which has been added after the polymerization reaction for the production of a hydroxycarboxylic acid based polyester are incorporated in the hydroxycarboxylic acid based polyester thus produced.

The molecular weight increasing agent to be incorporated as a structural unit is adapted to increase the molecular weight of and improve the flexibility, mechanical strength and other properties of a hydroxycarboxylic acid based polyester in particular. When added to a hydroxycarboxylic acid based polyester produced by polymerization in the presence of a polymerization catalyst, the polymerization catalyst deactivator complexes metal ions in the polymerization catalyst contained in the hydroxycarboxylic acid based polyester thus produced to deactivate the polymerization catalyst and hence enhance the thermal stability and storage stability of the polyester.

The hydroxycarboxylic acid employable herein is not specifically limited. Examples of the hydroxycarboxylic acid employable herein include hydroxycarboxylic acid such as glycolic acid, dimethylglycolic acid, 3-hydroxypropionic acid, 2-hydroxybutyric acid, 3-hydroxybutyric acid, 4-hydroxybutyric acid, 2-hydroxyvaleric acid, 3-hydroxyvaleric acid, 4-hydroxyvaleric acid, 5-hydroxyvaleric acid, 2-hydroxycaproic acid, 3-hydroxycaproic acid, 4-hydroxycaproic acid, 5-hydroxycaproic acid, 5-hydroxymethylcaproic acid, 6-hydroxycaproic acid, 6-hydroxymethylcaproic acid, L-lactic acid and D-lactic acid, cyclic ester such as glycolide, ε-caprolactone, γ-valerolactone, γ-undecanelactone, β-methyl-δ-valerolactone, L-lactide, D-lactide and meso-lactide, and mixture thereof. In particular, a hydroxycarboxylic acid based polyester made of a hydroxycarboxylic acid such as glycolic acid, L-lactic acid and D-lactic acid, a cyclic ester such as glycolide, L-lactide, D-lactide and meso-lactide or a mixture thereof may be preferably used.

Specific examples of the dicarboxylic acid component in the hydroxycarboxylic acid based polyester include aromatic dicarboxylic acid such as phthalic anhydride, isophthalic acid, terephthalic acid, chlorophthalic acid, nitrophthalic acid, p-carboxyphenylacetic acid, p-phenylenediacetic acid, m-phenylenediglycolic acid, p-phenylenediglycolic acid, diphenylacetic acid, diphenyl-p,p'-dicarboxylic acid, diphenyl-m,m'-dicarboxylic acid, o,o'-diphenyl-p,p'-diphenyldicarboxylic acid, diphenyl-4,4'-diacetic acid, diphenylmethane-p,p'-dicarboxylic acid, diphenylethane-m,m'-dicarboxylic acid, stilbenedicarboxylic acid, 1,1'-diphenylethane-p,p'-dicarboxylic acid, diphenylbutane-p,p'-dicarboxylic acid, benzophenone-4,4'-dicarboxylic acid, naphthalene-1,4-dicarboxylic acid, naphthalene-1,5-dicarboxylic acid, naphthalene-2,6-dicarboxylic acid, naphthalene-2,7-dicarboxylic acid, p-carboxyphenoxyacetic acid, p-carboxyphenoxybutylic acid, p-carboxyphenoxyvaleric acid, p-carboxyphenoxycaproic acid, p-carboxyphenoxyheptoic acid, p-carboxyphenoxyundecanoic acid, 1,2-diphenoxypropane-p,p'-dicarboxylic acid, 1,3-diphenoxypropane-p,p'-dicarboxylic acid, 1,4-diphenoxybutane-p,p'-dicarboxylic acid, 1,5-diphenoxypentane-p,p'-dicarboxylic acid, 1,6-diphenoxypentane-p,p'-dicarboxylic acid, p-(p-carboxyphenoxy)benzoic acid, p-(p-carboxybenzyloxy) benzoic acid, 1,2-bis(2-methoxyphenoxy) ethane-p,p'-dicarboxylic acid, 1,3-bis(2-methoxyphenoxy) propane-p,p'-dicarboxylic acid, 1,4-bis(2-methoxyphenoxy) butane-p,p'-dicarboxylic acid and 1,5-bis(2-methoxyphenoxy)-3-oxapentane-p,p'-dicarboxylic acid, aliphatic dicarboxylic acid such as malonic acid, succinic acid, glutaric acid, adipic acid, β-methyladipic acid, pimelic acid, cork acid, azelaic acid, sebacic acid, nonanedicarboxylic acid, decanedicarboxylic acid, undecanedicarboxylic acid, dodecanedicarboxylic acid, maleic anhydride, fumaric acid, citraconic acid, diglycolic acid, cyclohexa-3,5-diene-1,2-carboxylic acid, malic acid, citric acid, trans-hexahydroterephthalic acid, cis-hexahydroterephthalic acid and dimer acid, and mixture thereof.

In particular, the use of a $C_{4-20}$ aliphatic dicarboxylic acid provides an excellent flexibility. The use of a dicarboxylic acid having a double bond such as maleic anhydride, fumaric acid and dimer acid provides an excellent heat resistance.

Specific examples of the diol employable herein include ethylene glycol, propylene glycol, trimethylene glycol, butane-1,2-diol, butane-1,3-diol, butane-1,4-diol, butane-2,3-diol, 2,2-dimethylpropane-1,3-diol, cis-2-butene-1,4-diol, trans-2-butene-1,4-diol, tetramethylene glycol, pentamethylene glycol, hexamethylene glycol, heptamethylene glycol, octamethylene glycol, nonamethylene glycol, decamethylene glycol, undecamethylene glycol, dodecamethylene glycol, tridecamethylene glycol, eicosamethylene glycol, trans-1,4-cyclohexanedimethanol, 2,2,4-trimethylpentane-1,3-diol, hydrogenated bisphenol A, p-xylylene glycol, diethylene glycol, triethylene glycol, dipropylene glycol, tripropylene glycol, and mixture thereof.

Further, the use of a polyoxyalkylene having many oxygen atoms of ether bond as a diol provides an excellent flexibility. Examples of the polyoxyalkylene include polyethylene glycol, polypropylene glycol, polybutylene glycol, polypentane diol, polytetramethylene glycol, and block copolymer of polyethylene glycol with polypropylene glycol.

If an aliphatic dicarboxylic acid and an aliphatic diol are used as dicarboxylic acid and diol, the resulting hydroxycarboxylic acid based polyester tends to exhibit excellent biodegradability and flexibility. If a component having a branched chain is used, the resulting hydroxycarboxylic acid based polyester tends to exhibit an excellent transparency.

Examples of the molecular weight increasing agent employable herein include polyvalent carboxylic acid, metal complex, epoxy compound, isocyanate, and mixture thereof. The molecular weight increasing agent exerts an effect of reacting with a hydroxycarboxylic acid component, a diol component or a dicarboxylic acid component or combining with the terminal hydroxyl group or carboxylic group of the oligomer or polymer produced and then two-dimensionally or three-dimensionally bonding these oligomer molecules or polymer molecules to increase the molecular weight of the resulting hydroxycarboxylic acid based polyester and hence inhibit the drop of molecular weight due to heat at the forming step.

Examples of the polyvalent carboxylic acid include (anhydrous) maleic acid, hexahydrophthalic acid, (anhydrous) maleic acid, trimethyladipic acid, (anhydrous) trimellitic acid, (anhydrous) pyromellitic acid, (anhydrous) 3,3',4,4'-benzophenonetetracarboxylic acid, 1,2,3,4-butanetetracarboxylic acid, Epiclon 4400 (available from Dainippon Ink & Chemicals, Inc.), and mixtures thereof. In particular, a trifunctional or higher carboxylic acid and/or acid anhydride thereof is effective for the rise in the molecular weight.

Examples of the metal complex employable herein include lithium formate, sodium methoxide, potassium propionate, magnesium ethoxide, calcium propionate, manganese acetyl acetonate, cobalt acetyl acetonate, zinc acetyl acetonate, cobalt acetyl acetonate, iron acetyl acetonate, aluminum acetyl acetonate, aluminum isopropoxide, tetrabutoxy titanium, and mixture thereof. In particular, a divalent or higher metal complex exerts a great effect.

Examples of the epoxy compound employable herein include bisphenol A type diglycidyl ether, 1,6-hexanediol diglycidyl ether, trimethylol propane triglycidyl ether, terephthalic acid diglycidyl ester, tetrahydrophthalic acid diglycidyl ester, o-phthalic acid diglycidyl ester, 3,4-epoxycyclohexylmethyl-3,4-epoxycyclohexanecarboxylate, bis(3,4-epoxycyclohexyl)adipate, and tetradecane-1,14-dicarboxylic acid glycidyl ester.

Examples of the isocyanate employable herein include hexamethylene diisocyanate, 2,4-tolylene diisocyanate, 2,6-tolylene diisocyanate, xylylene diisocyanate, diphenylmethane diisocyanate, 1,5-naphthylene diisocyanate, isophorone diisocyanate, hydrogenated diphenylmethane diisocyanate, diisocyanate-modified polyether, diisocyanate-modified polyester, compound obtained by modifying polyvalent alcohol with bifunctional isocyanate, polyvalent isocyanate-modified polyether, polyvalent isocyanate-modified polyester, and mixture thereof.

Preferred among these molecular weight increasing agents are polyvalent carboxylic acid and/or acid anhydride thereof, and metal complex from the standpoint of safety and colorability. Particularly preferred among these molecular weight increasing agents is aliphatic compound from the standpoint of biodegradability.

As the polymerization catalyst to be used in the production of the hydroxycarboxylic acid based polyester of the present invention there may be used a common polymerization catalyst known as ring opening polymerization catalyst, esterification catalyst or ester interchange catalyst. Specific examples of such a polymerization catalyst include metal such as tin, zinc, lead, titanium, bismuth, zirconium, germanium and cobalt, and compound thereof. Particularly preferred examples of the metal compound include organic metal compound, metal carbonate, and metal halide.

Specific preferred examples of the metal compound include tin octanoate, tin chloride, zinc chloride, zinc acetate, lead oxide, lead carbonate, titanium chloride, diacetoacetoxyoxytitanium, tetraethoxytitanium, tetrapropoxytitanium, tetrabutoxytitanium, germanium oxide, and zirconium oxide. The amount of such a metal compound to be added is preferably from 0.001 to 2 parts by weight, more preferably from 0.002 to 0.5 part by weight from the standpoint of reaction rate and colorability, based on 100 parts by weight of the reactive components. Such a polymerization catalyst is preferably added in the initial stage of polymerization or in the course of polymerization reaction.

Examples of the polymerization catalyst deactivator employable herein include chelating agent, and acidic phosphate. Examples of the chelating agent include organic chelating agent, and inorganic chelating agent. An organic chelating agent has a low hygroscopicity and an excellent thermal stability.

The organic chelating agent employable herein is not specifically limited. Examples of the organic chelating agent include amino acid, phenol, hydroxycarboxylic acid, diketone, amine, oxim, phenanthrolin, pyridine, dithio compound, phenol containing nitrogen as a coordinated atom, carboxylic acid containing nitrogen as a coordinated atom, diazo compound, thiol, and porphyrin. Such an organic chelating agent is adapted to complex metallic ions in the catalyst contained in the hydroxycarboxylic acid based polyester and hence eliminate the catalyst activity.

Specific examples of the amino acid include glycine, leucine, alanine, serine, α-aminobutyric acid, acetylaminobutyric acid, glycylglycine, and glutamic acid. Specific examples of the phenol include alizarin, t-butylcatechol, 4-isopropyltropolone, chromotropic acid, tiron, oxin, and propyl gallate. Specific examples of the hydroxycarboxylic acid include tartaric acid, oxalic acid, citric acid, monooctyl citrate, dibenzoyl-D-tartaric acid, and di-p-toluoyl-D-tartaric acid. Specific examples of the diketone include acetylacetone, hexafluoroacetylacetone, benzoylacetone, thenoyltrifluoroacetone, and trifluoroacetylacetone. Specific examples of the amine include ethylenediamine, diethylenetriamine, 1,2,3-triaminopropane, thiodiethylamine, triethylnetetramine, triethanolamine, tetraethylenepentamine, and pentaethylenehexamine. Specific examples of the oxime include dimethylglyoxime, α,α-furyldioxime, and salicylaldoxime. Specific examples of the phenanthroline include neocuproine, and 1,10-phenanthroline. Specific examples of the pyridine compound include 2,2-bipyridine, and 2,2',2"-terpyridine. Specific examples of the dithio compound include xanthogenic acid, diethyldithiocarbamic acid, and toluene-3,4-dithiol. Specific examples of the phenol including coordinated atom N include o-aminophenol, oxine, nitroso-R salt, 2-nitroso-5-dimethylaminophenol, 1-nitroso-2-naphthol, and 8-selenoquinoline. Specific examples of the carboxylic acid including coordinated atom N include quinaldinic acid, nitrilotriacetic acid, ethylenediaminediacetic acid, hydroxyethylethylenediaminetriacetic acid, ethylenedimainetetraacetic acid, trans-cyclohexanediaminetetraacetic acid, diethylenetriaminepentaacetic acid, triethylenetetraminehexaacetic acid, anilinediacetic acid, 2-sulfoanilinediacetic acid, 3-sulfoanilinediacetic acid, 4-sulfoanilinediacetic acid, 2-aminobenzoic acid-N,N-diacetic acid, 3-aminobenzoic acid-N,N-diacetic acid, 4-aminobenzoic acid-N,N-diacetic acid, methylaminediacetic acid, β-alanine-N,N-diacetic acid, β-aminoethylsulfonic acid-N,N-diacetic acid, and β-aminoethylphosphonic acid-N,N-diacetic acid. Specific examples of the diazo compound include diphenylcarbazone, magneson, dithizone, Eriochrome Black T, 4-(2-thiazolylazo)resorcin, and 1-(2-pyridylazo)-2-naphthol. Specific examples of the thiol include thiooxine, thionalide, 1,1,1-trifluoro-4-(2-thienyl)-4-mercapto-3-butene-2-one, and 3-mercapto-p-cresol. Specific examples of the porphyrin include tetraphenylporphyrin, and tetrakis(4-N-methylpyridyl)porphyrin. Specific examples of other organic chelating agents include cupferron, murexide, polyethyleneimine, polymethylacryloylacetone, polyacrylic acid, and mixture thereof.

Examples of the organic chelating agent which undergoes efficient coordinate bond to metallic ions contained in the hydroxycarboxylic acid based polyester to inhibit the break of polymer chain include carboxylic acid including coordinated atom N such as nitrilotriacetic acid, ethylenediaminediacetic acid, tetraethylenepentamine, hydroxyethylethylenediaminetriacetic acid, ethylenediaminetetraacetic acid, trans-cyclohexanediaminetetraacetic acid, diethylenetriaminepentaacetic acid and triethylenetetraminehexaacetic acid, and hydroxycarboxylic acid such as tartaric acid, dibenzoyl-D-tartaric acid, di-p-toluoyl-D-tartaric acid, citric acid and monooctyl citrate.

In particular, the foregoing carboxylic acid including coordinated atom N exhibits excellent thermal stability and storage stability. The foregoing hydroxycarboxylic acid is little colored. The inorganic chelating agent has a high hygroscopicity and thus loses its effect when takes up water. Accordingly, the inorganic chelating agent must be handled with caution. Specific examples of the inorganic chelating agent include phosphoric acid such as phosphoric acid, phosphorous acid, pyrophosphoric acid and polyphosphoric acid.

The acidic phosphate to be used in the present invention complexes metallic ions in the catalyst contained in the hydroxycarboxylic acid based polyester and hence impairs the catalyst activity to exert an effect of inhibiting the break of polymer chain. Examples of the acidic phosphate include acidic phosphate, phosphonic acid ester, alkylphosphonic acid, and mixture thereof. Such an acidic phosphate is represented by the following general formula:

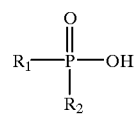

wherein $R_1$ represents an alkyl group or an alkoxyl group; and $R_2$ represents an alkyl group, an alkoxyl group or a hydroxyl group.

Specific examples of the acidic phosphate include monomethyl phosphate, dimethyl phosphate, monoethyl phosphate, diethyl phosphate, monopropyl phosphate, dipropyl phosphate, monoisopropyl phosphate, diisopropyl phosphate, monobutyl phosphate, dibutyl phosphate, monopentyl phosphate, dipentyl phosphate, monohexyl phosphate, dihexyl phosphate, monooctyl phosphate, dioctyl phosphate, mono-2-ethylhexyl phosphate, di-2-ethylhexyl phosphate, monodecyl phosphate, didecyl phosphate, monoisodecyl phosphate, diisodecyl phosphate, monoundecyl phosphate, diundecyl phosphate, monododecyl phosphate, didodecyl phosphate, monotetradecyl phosphate, ditetradecyl phosphate, monohexadecyl phosphate, dihexadecyl phosphate, monooctadecyl phosphate, dioctadecyl phosphate, monophenyl phosphate, diphenyl phosphate, monobenzyl phosphate, and dibenzyl phosphate. Specific examples of the phosphonic acid ester include monomethyl phosphonate, monoethyl phosphonate, monopropyl phosphonate, monoisopropyl phosphonate, monobutyl phosphonate, monopentyl phosphonate, monohexyl phosphonate, monooctyl phosphonate, monoethylhexyl phosphonate, monodecyl phosphonate, monoisodecyl phosphonate, monoundecyl phosphonate, monododecyl phosphonate, monotetradecyl phosphonate, monohexadecyl phosphonate, monooctadecyl phosphonate, monophenyl phosphonate, and monobenzyl phosphonate. Specific examples of the alkylphosphonic acid include monomethylphosphonic acid, dimethylphosphonic acid, monoethylphosphonic acid, diethylphosphonic acid, monopropylphosphonic acid, dipropylphosphonic acid, monoisopropylphosphonic acid, diisopropylphosphonic acid, monobutylphosphonic acid, dibutylphosphonic acid, monopentylphosphonic acid, dipentylphosphonic acid, monohexylphosphonic acid, dihexylphosphonic acid, isooctylphosphonic acid, dioctylphosphonic acid, monoethylhexylphosphonic acid, diethylhexylphosphonic acid, monodecylphosphonic acid, didecylphosphonic acid, monoisodecylphosphonic acid, diisodecylphosphonic acid, monoundecylphosphonic acid, diundecylphosphonic acid, monododecylphosphonic acid, didodecylphosphonic acid, monotetradecylphosphonic acid, ditetradecylphosphonic acid, monohexadecylphosphonic acid, dihexadecylphosphonic acid, monooctadecylphosphonic acid, dioctadecylphosphonic acid, monophenylphosphonic acid, diphenylphosphonic acid, monobenzylphosphonic acid, and dibenzylphosphonic acid.

The acidic phosphate has a good solubility in an organic solvent and thus can be well worked. The acidic phosphate can well deactivate the polymerization catalyst used in the polymerization reaction for the production of a hydroxycarboxylic acid based polyester, particularly lactic acid based polyester.

The process for the preparation of the hydroxycarboxylic acid based polyester to be used in the present invention will be described in order. The preparation of the hydroxycarboxylic acid based polyester of the present invention can be accomplished in various manners. The process for the preparation of the hydroxycarboxylic acid based polyester of the present invention is not specifically limited. Main processes will be exemplified hereinafter.

The preparation of the hydroxycarboxylic acid based polyester containing a structural unit derived from hydroxycarboxylic acid can be accomplished by a process utilizing the production of microorganism or by a chemical synthesis process.

The process utilizing the production of microorganism can apply to the production of a copolymer of 3-hydroxybutyric acid with 3-hydroxyvaleric acid. The copolymer can be produced by the fermentation of sugar and propionic acid as starting material with the aid of microorganism.

The lactic acid based polyester containing lactic acid as a structural unit can be prepared by the dehydropolycondensation of lactic acid or lactic acid and components copolymerizable therewith in the presence of a solvent as disclosed in JP-A-6-172502 and JP-A-7-172425 or by the ring opening polymerization of a lactide or other cyclic esters in the presence of a catalyst as disclosed in "Polymer", vol. 20, page 1459, 1979.

The preparation of the hydroxycarboxylic acid based polyester comprising a structural unit derived from hydroxycarboxylic acid, a structural unit derived from molecular weight increasing agent and/or a structural unit derived from polymerization catalyst deactivator can be accomplished by a process which comprises the addition polymerization or dehydro-polycondensation of a hydroxycarboxylic acid and a molecular weight increasing agent in the presence of a polymerization catalyst, optionally followed by the reaction with a polymerization catalyst deactivator, or like processes.

The preparation of the lactic acid based polyester comprising a structural unit derived from lactic acid, a structural unit derived from molecular weight increasing agent and/or a structural unit derived from polymerization catalyst deactivator can be accomplished by a process which comprises subjecting lactic acid and a molecular weight increasing agent to dehydro-polycondensation in the presence of a polymerization catalyst or subjecting a lactide and a molecular weight increasing agent to ring opening polymerization in the presence of a ring opening polymerization catalyst, reacting the product with a polymerization catalyst deactivator, and then removing residual volatile matter, particularly residual lactide.

The time at which the molecular weight increasing agent is added during the preparation of the hydroxycarboxylic acid based polyester comprising a structural unit derived from hydroxycarboxylic acid, a structural unit derived from molecular weight increasing agent and/or a structural unit derived from polymerization catalyst deactivator, a structural unit derived from dicarboxylic acid, and a structural unit derived from diol, particularly lactic acid based polyester, is not limited. It may be before, during or after polymerization or at devolatilization step, extrusion step or forming step after polymerization.

The polymerization catalyst deactivator may be added and reacted at the end of the polymerization step, at the devolatilization step, at the extrusion step, at the forming step or at any other steps. In some detail, a polyester comprising a structural unit derived from dicarboxylic acid and a structural unit derived from diol may be reacted with a molecular weight increasing agent. The reaction product is then copolymerized with a lactide in the presence of a ring opening polymerization catalyst. The copolymerization product is then reacted with a catalyst deactivator. The residual volatile matter, particularly residual lactide, is then removed from the product.

Alternatively, the product of the copolymerization of a polyester comprising a structural unit derived from dicarboxylic acid and a structural unit derived from diol with a lactide in the presence of a ring opening polymerization catalyst may be reacted with a molecular weight increasing agent. The reaction product is then reacted with a polymerization catalyst deactivator. The residual volatile matter, particularly residual lactide, is then removed.

Alternatively, a lactic acid, a dicarboxylic acid, a diol and a molecular weight increasing agent may be subjected to polycondensation or ester interchange reaction by dehydration/deglycolation in the presence of a polymerization catalyst. Subsequently, the reaction product is reacted with a polymerization catalyst deactivator. The residual volatile matter, particularly residual lactide, is then removed from the product.

Alternatively, a lactic acid, a dicarboxylic acid and a diol may be subjected to polycondensation or ester interchange reaction by dehydration/deglycolation in the presence of a catalyst. The resulting copolymer is then reacted with a molecular weight increasing agent. The reaction product is then reacted with a polymerization catalyst deactivator. The residual volatile matter, particularly residual lactide, is then removed from the product.

Alternatively, a polyester comprising a structural unit derived from polylactic acid prepared from a lactide as a starting material or obtained by the polycondensation of a lactic acid in the presence or absence of a solvent, a structural unit derived from dicarboxylic acid and a structural unit derived from diol and a molecular weight increasing agent may be subjected to ester interchange in the presence of an ester interchange catalyst. The reaction product is then reacted with a polymerization catalyst deactivator. The residual volatile matter, particularly residual lactide, is then removed from the product.

Alternatively, a polylactic acid, a dicarboxylic acid and a polyester comprising a diol may be subjected to ester interchange in the presence of an ester interchange catalyst. The resulting lactic acid based polyester is then reacted with a molecular weight increasing agent. The reaction product is then reacted with a polymerization catalyst deactivator. The residual volatile matter, particularly residual lactide, is then removed from the product.

The polyester comprising a dicarboxylic acid and a diol to be used in the preparation of a lactic acid based polyester can be prepared by a common known method which comprises subjecting a dicarboxylic acid and a diol to polycondensation or ester interchange reaction by dehydration/deglycolation in the presence of a catalyst.

In the preparation of the hydroxycarboxylic acid based polyester to be used in the present invention, particularly lactic acid based polyester, hydroxycarboxylic acids other than lactic acid, cyclic esters other than lactide, etc. may be added in an amount of from 1 to 50 parts by weight, preferably from 1 to 30 parts by weight, based on 100 parts by weight of the lactic acid based polyester depending on purposes such as softening and enhancement of mechanical strength and heat resistance. The time at which these components are added is not specifically limited but may be during the synthesis of the lactic acid based polyester containing lactic acid or lactide as a structural unit.

Further, an alcohol component such as stearyl alcohol, trimethylolethane, trimethylolpropane, pentaerythritol and glycerin may be added as a viscosity modifier in a small amount. A solvent may be used for the purpose of lowering the viscosity of the reaction system and enhancing the stirring efficiency at the polymerization step to obtain a high quality.

The solvent which can be used in the preparation of the hydroxycarboxylic acid based polyester to be used herein is not specifically limited but is preferably benzene, toluene, ethylbenzene, xylene, cyclohexanone, isopropyl ether, diphenyl ether or the like. The amount of such a solvent to be added depends on the preparation method, the preparation conditions, the kind and composition of the reaction components, etc. but is normally not more than 100 parts by weight, preferably not more than 50 parts by weight based on 100 parts by weight of the reaction components.

The reaction temperature at which the hydroxycarboxylic acid based polyester of the present invention, particularly lactic acid based polyester, is prepared depends on the kind, amount and combination of copolymerizable components such as polyester comprising a dicarboxylic acid and a diol and cyclic ester but is normally from 125° C. to 250° C., preferably from 140° C. to 230° C., more preferably from 150° C. to 200° C.

In order to inhibit the decomposition and coloring of the hydroxycarboxylic acid based polyester, particularly lactic acid based polyester, it is necessary that the reaction be effected in an atmosphere of inert gas such as nitrogen and argon without coming in contact with the atmosphere and the starting materials to be supplied for the reaction be dried to remove water content therefrom.

The preparation of the hydroxycarboxylic acid based polyester, particularly lactic acid based polyester, can be accomplished by means of an ordinary reaction apparatus. In general, when the viscosity of the polymerization solution is as high as greater than 1,000 poise, a remarkable heat generation occurs due to stirring shear stress, not to mention polymerization heat. Accordingly, a static mixer which can uniformly act on the polymerization solution with a small shear stress is preferably used.

The static mixer is normally cylindrical. In operation, a plurality of such static mixers are linearly combined. In this arrangement, the starting materials are continuously supplied into the reaction system through an intake in an atmosphere of inert gas so that the reaction materials move continuously through the static mixers. In this manner, the reaction can be continuously effected beginning with the supply of the starting materials to the polymerization thereof without coming in contact with the atmosphere.

Further, continuous polymerization by using a continuous stirred tank reactor (CSTR), continuous polymerization by using a combination of CSTR with static mixer, and continuous reaction by using a twin screw extruder can also be effective. In these manners, the reaction can also be continuously effected beginning with the supply of the starting materials to the polymerization thereof without coming in contact with the atmosphere.

The volatile components such as unreacted components, solvents and odor components in the hydroxycarboxylic acid based polyester thus obtained can be removed through a devolatilizing apparatus such as devolatilizing tank, film evaporator and vented extruder installed at the end of the reaction step. Alternatively, these volatile components can be dissolved in a good solvent, and then precipitated in a poor solvent so that they are removed. Further, these volatile components can be dipped or dispersed in a solvent such as alcohol, ketone and hydrocarbon without being dissolved therein so that they are extracted away.

The volatile components such as unreacted components, solvents and odor components in the hydroxycarboxylic acid based polyester are preferably removed to enhance the moldability, heat resistance, storage stability and other properties of the hydroxycarboxylic acid based polyester. The removal method using a solvent makes it possible to efficiently remove high boiling components, excess unreacted molecular weight increasing agent components and polymerization catalyst deactivator components, resulting in excellent thermal stability and storage stability.

The devolatilization makes it possible to drastically reduce the volatile components such as unreacted components, solvents and odor components in the hydroxycarboxylic acid based polyester. For example, in the case of lactic acid based polyester, the residual amount of a lactide, which is normally from 2 to 5% by weight, can be reduced to not more than 1.0% by weight, optionally not more than 0.1% by weight.

The formulation of the hydroxycarboxylic acid based polyester to be used in the present invention will be described hereinafter in order. The ratio of the structural unit (a) derived from lactic acid or lactide of the present invention to the structural unit (b) derived from dicarboxylic acid and diol is not specifically limited but is preferably from 99/1 to 10/90 as calculated in terms of parts by weight. In order to obtain a high melting point, the ratio (a)/(b) is more preferably from 99/1 to 40/60 as calculated in terms of parts by weight. In order to obtain a high stiffness, the ratio (a)/(b) is more preferably from 99/1 to 70/30 as calculated in terms of parts by weight. In order to obtain an excellent flexibility, the ratio (a)/(b) is more preferably from 70/30 to 40/60 as calculated in terms of parts by weight.

In order to provide the hydroxycarboxylic acid based polyester of the present invention, particularly lactic acid based polyester, with an excellent heat resistance, the lactic acid to be incorporated as a structural unit preferably has a high optical activity. In some detail, the content of L-form or D-form preferably accounts for not less than 70% by weight of all lactic acids. In order to obtain a high heat resistance, the content of L-form or D-form preferably accounts for not less than 80% by weight of all lactic acids.

Further, the content of L-lactide or D-lactide preferably accounts for not less than 70% by weight of all lactides. In order to obtain a high heat resistance, the content of L-lactide or D-lactide preferably accounts for not less than 80% by weight of all lactides. On a commercial basis, L-lactic acid can be obtained in a high purity at a lower cost than D-lactic acid by fermentation synthesis. Therefore, the lactic acid based polyester preferably comprises L-lactic acid as a lactic acid or L-lactide as a lactide.

The amount of the molecular weight increasing agent component to be added depends on its kind but is preferably from 0.001 to 5 parts by weight, more preferably from 0.01 to 2 parts by weight based on 100 parts by weight of the hydroxycarboxylic acid based polyester. If the amount of the molecular weight increasing agent component exceeds 5 parts by weight, the hydroxycarboxylic acid based polyester is subject to gelation, coloring or viscosity drop. In particular, if an acidic substance such as polyvalent carboxylic acid remains unreacted, the hydroxycarboxylic acid based polyester chain is broken during storage. Thus, excessive addition of such an acidic substance is not desirable. If the amount of the molecular weight increasing agent component falls below 0.001 parts by weight, a sufficient molecular weight increasing effect cannot be exerted.

The amount of the chelating agent or acidic phosphate to be added as a polymerization catalyst deactivator depends on its kind and the kind and amount of the polymerization catalyst contained in the hydroxycarboxylic acid based polyester but may be such that the polymerization catalyst 1.5 can be deactivated. It is normally from 0.001 to 5 parts by weight based on 100 parts by weight of the hydroxycarboxylic acid based polyester.

The chelating agent and acidic phosphate can minimize the break of polymer chain. The chelating agent and acidic phosphate may be used in admixture. However, if the polymerization catalyst deactivator component is added excessively, the hydroxycarboxylic acid based polyester chain is broken during storage or the like, making it impossible to obtain the desired properties of the present invention.

Accordingly, the polymerization catalyst deactivator component needs to be added in an amount of not more than 5 parts by weight.

The weight-average molecular weight of the hydroxycarboxylic acid based polyester constituting the expanded material of the present invention is from 20,000 to 400,000, preferably from 30,000 to 300,000. If the weight-average molecular weight of the hydroxycarboxylic acid based polyester falls below 20,000, the resulting expanded material exhibits an insufficient strength. If the weight-average molecular weight of the hydroxycarboxylic acid based polyester exceeds 400,000, the hydroxycarboxylic acid based polyester leaves something to be desired in moldability and production efficiency.

Referring to the process for the preparation of the expanded material of the present invention, the hydroxycarboxylic acid based polyester comprising as structural units a molecular weight increasing agent component and/or a polymerization catalyst deactivator component may be freed of volatile components under reduced pressure or by extraction with a solvent, and then melt-blended with a nucleating agent and a blowing agent in an extruder so that it is expanded. Alternatively, the polyester comprising a structural unit derived from dicarboxylic acid and a structural unit derived from diol may be melt-blended with a nucleating agent and a blowing agent in an extruder so that it is expanded.

In another embodiment of the process for the preparation of the expanded material of the present invention, the hydroxycarboxylic acid based polyester which has been freed of volatile components under reduced pressure or by extraction with a solvent and a molecular weight increasing agent and/or a polymerization catalyst deactivator may be melt-blended with a nucleating agent and a blowing agent in an extruder so that it is expanded. Alternatively, the polyester comprising a structural unit derived from dicarboxylic acid and a structural unit derived from diol may be melt-blended with a nucleating agent and a blowing agent in an extruder so that it is expanded.

In the preparation of the expanded material of the present invention, as the blowing agent there may be used a volatile foaming agent or decomposable blowing agent. The volatile foaming agent is added to the hydroxycarboxylic acid based polyester or a mixture thereof with the polyester comprising a structural unit derived from dicarboxylic acid and a structural unit derived from diol (hereinafter occasionally referred to as "resin"). The mixture is then kneaded so that the resin is impregnated with the blowing (foaming) agent. When the volatile foaming agent then volatilizes, the resin is expanded. On the other hand, the decomposable blowing agent is dispersed in the resin, and then decomposed to produce a gas that expands the resin.

As the volatile foaming agent employable herein there may be used an aliphatic hydrocarbon foaming agent, halogenated hydrocarbon foaming agent or the like. In general, a volatile foaming agent having a boiling point of not higher than 95° C. at atmospheric pressure may be used. Examples of the foregoing aliphatic hydrocarbon foaming agent include ethane, propane, normal butane, isobutane, normal pentane, isopentane, normal hexane, isohexane, cyclopentane, cyclohexane, and petroleum ether.

Examples of the halogenated hydrocarbon foaming agent employable herein include methyl chloride, ethyl chloride, dichloroethane, chloroform, fluoromethane, difluoromethane, trifluoromethane, difluoroethane, trifluoroethane, fluorochloromethane, fluorochloroethane, dichlorodifluoromethane, Flon (fluorocarbon) (R-11, R-12), and alternative fluorocarbon R-134a. Particularly preferred among these foaming agents is $C_{3-6}$ aliphatic hydrocarbon, particularly propane, normal butane, isobutane, isobutyrene, normal pentane, isopentane and mixture thereof.

Examples of the decomposable blowing agent include organic blowing agent, and inorganic blowing agent. In the present invention, either decomposable blowing agent may be used. Alternatively, these blowing agents may be used in admixture. Examples of the organic blowing agent employable herein include azodicarbonamide, 4,4'-oxybisbenzenesulfonylhydrazide, benzenesulfonylhydrazide, and azobisisobutylonitrile. Examples of the inorganic blowing agent employable herein include sodium bicarbonate, and ammonium bicarbonate. When a volatile foaming agent and a decomposable blowing agent are used in combination, a expanded material can be prepared at a higher expansion ratio. The resulting expanded material of the present invention has fine cells and an excellent flexibility.

Further, an inert gas such as carbon dioxide gas, nitrogen, helium and argon may be allowed to penetrate into the polyester as a volatile foaming agent. Such an inert gas may be mixed and dispersed in the resin as it is in the form of gas. In particular, liquefied carbon dioxide gas provides a higher expansion ratio than aliphatic hydrocarbon foaming agent and halogenated hydrocarbon foaming agent. Thus, liquefied carbon dioxide gas can easily provide an expanded material having fine cells. Further, liquefied carbon dioxide gas gives little burden on environment. Liquefied carbon dioxide gas cannot be ignited. Thus, liquefied carbon dioxide gas is desirable. These blowing agents may be used singly or in combination. As a blowing aid there may be used a plasticizer or solvent such as toluene, ethylbenzene, xylene and cyclohexane.

In the preparation of the expanded material of the present invention, a nucleating agent which acts as a nucleus during expansion to adjust the diameter of foams, a lubricant or wax for inhibiting the shearing heat generation during extrusion foaming, a filler for enhancing the heat resistance or stiffness of the expanded material, a colorant for coloring the expanded material, etc. may be added.

Examples of the nucleating agent include talc, particulate silica, sodium citrate, calcium carbonate, and sodium carbonate. Examples of the lubricant or wax include paraffin such as paraffin oil and solid paraffin, higher fatty acid such as stearic acid and palmitic acid, higher alcohol such as palmityl alcohol and stearyl alcohol, metal salt of fatty acid such as calcium stearate, zinc stearate, barium stearate, aluminum stearate, magnesium stearate and sodium palmitate, fatty acid ester such as butyl stearate, glycerin monostearate and diethylene glycol monostearate, ethylenediamide such as stearamide, methylenebisstearamide, ethylenebisstearamide and oxystearic acid, fatty acid amide such as methylolamide, oleylamide and erucylamide, wax such as carnauba wax and montan wax, and mixture thereof.

The amount of the nucleating agent to be added is preferably not more than 10 parts by weight, particularly from 0.01 to 5 parts by weight based on 100 parts by weight of the hydroxycarboxylic acid based polyester.

If the amount of the nucleating agent to be added exceeds 10 parts by weight, voids are generated in the resulting expanded material. Thus, the blowing agent escape from the surface of the expanded material, making it impossible to obtain a good formed product. The amount of the lubricant or wax to be added is preferably from 0.01 to 5 parts by weight based on 100 parts by weight of the hydroxycarboxylic acid based polyester.

As the filler there may be used an inorganic filler or organic filler. Examples of the inorganic filler employable herein include diatomaceous earth, calcined perlite, zeolite, kaolin, bentonite, silica, clay, glass, limestone, calcium silicate, calcium sulfate, aluminum oxide, magnesium carbonate, and ferric carbonate. Examples of the organic filler employable herein include wood flour, starch, cellulose, and cellulose derivative. These fillers may be used in combination. The amount of the filler to be added is not specifically limited but is preferably from 1 to 50 parts by weight based on 100 parts by weight of the hydroxycarboxylic acid based polyester.

As the colorant there may be used titanium oxide, carbon black, etc.

Further, a polyester comprising a hydroxycarboxylic acid component or cyclic ester may be incorporated in an amount of from 1 to 50 parts by weight based on 100 parts by weight of the hydroxycarboxylic acid based polyester depending on purposes such as softening and enhancement of mechanical strength and heat resistance.

These components are not specifically limited. Examples of these components include polymer of hydroxycarboxylic acid such as glycolic acid, dimethylglycolic acid, 3-hydroxypropanic acid, 2-hydroxybutyric acid, 3-hydroxybutyric acid, 4-hydroxybutyric acid, 2-hydroxyvaleric acid, 3-hydroxyvaleric acid, 4-hydroxyvaleric acid, 5-hydroxyvaleric acid, 2-hydroxycaproic acid, 3-hydroxycaproic acid, 4-hydroxycaproic acid, 5-hydroxycaproic acid, 5-hydroxymethylcaproic acid, 6-hydroxymethylcaproic acid, L-lactic acid and D-lactic acid, polymer of cyclic ester such as glycolide, β-methyl-δ-valerolactone, γ-valerolactone, γ-undecalactone, ε-caprolactone, L-lactide, D-lactide and meso-lactide, and mixture or copolymer thereof.

The hydroxycarboxylic acid based polyester of the present invention can be sufficiently plastic per se and thus exhibits an excellent moldability. In order to provide a higher fluidity or flexibility, the hydroxycarboxylic acid based polyester of the present invention may comprise a plasticizer such as diethyl succinate, dibutyl succinate, dioctyl adipate, diethyl sebacate, dibutyl sebacate, dioctyl sebacate, dibutyl azelate, trioctyl trimellitate, diethyl phthalate, dioctyl phthalate, polypropyleneglycoladipic acid, polyethyleneglycoladipic acid, butanediol adipate, block copolymer of ethylene with propylene, mineral oil and liquid paraffin incorporated therein. A plasticizer which exhibits a good compatibility with lactic acid based polyester or a high softening point and hence normally stays solid causes little bleeding and thus is desirable. Particularly preferred is a polyester having a number-average molecular weight of not greater than 30,000 terminated by an alcohol or the like. Further, an adipic acid based polyester exerts a great effect of enhancing the flexibility of the polyester in particular.

The amount of such a plasticizer to be added is preferably from 1 to 40 parts by weight based on 100 parts by weight of the hydroxycarboxylic acid based polyester such that the elution of excessive plasticizer from the polymer, i.e., bleeding can be avoided.

Further, the hydroxycarboxylic acid based polyester of the present invention may comprise an anionic surface active agent such as carboxylate, sulfonate, sulfuric acid ester and phosphoric acid ester, a cationic surface active agent such as aliphatic amine salt, aliphatic quaternary ammonium salt, aromatic ammonium salt and heterocyclic ammonium salt, an amphoteric surface active agent such as betaine, aminocarboxylate and imidazoline derivative, an ether type surface active agent such as alkylpolyalkylene ether, allylpolyalkylene ether and polyoxyethylene polyoxypropyl alkyl ether, an ether ester type surface active agent such as polyoxyethylene ether of glycerin ester and polyoxyethylene ether of sorbitan ester, an ester type surface active agent such as polyethylene glycol fatty acid ester, glycerin ester, propylene glycol and sugar ester, or a nonionic surface active agent such as aliphatic alkanolamide, polyoxyethylene fatty acid amide, polyoxyethylene alkylamine and amine oxide incorporated therein.

The amount of such a surface active agent to be added is preferably from 0.001 to 1 part by weight based on 100 parts by weight of the hydroxycarboxylic acid based polyester.

During the preparation of the expanded material of the present invention, an oxidation inhibitor, a thermal stabilizer, an ultraviolet absorbent, an antistatic agent, a fire retardant, etc. may be added at any steps before, during or after the polymerization for the production of hydroxycarboxylic acid based polyester, at the devolatilization step or extrusion step after polymerization. The amount of these additives to be added is preferably from 0.01 to 5 parts by weight based on 100 parts by weight of the hydroxycarboxylic acid based polyester.

Specific examples of the oxidation inhibitor employable herein include 2,6-di-t-butyl-p-cresol, butylated hydroxyanisole, 2,6-di-t-butyl-4-ethylphenol, distearyl-3,3'-thiodipropionate and dilauryl-3,3'-thiodipropionate. Specific examples of the thermal stabilizer employable herein include triphenyl phosphite, trilauryl phosphite, and tris-nonylphenyl phosphite. Specific examples of the ultraviolet absorbent employable herein include p-t-butylphenyl salicylate, 2-hydroxy-4-methoxybenzophenone, 2-hydroxy-4-methoxy-2'-carboxybenzophenone and 2,4,5-trihydroxybutylophenone. Specific examples of the antistatic agent employable herein include N,N-bis (hydroxyethyl) alkylamine, alkylamine, alkylallyl sulfonate, and alkyl sulfonate. Specific examples of the fire retardant employable herein include hexabromocyclododecane, tris-(2,3-dichloropropyl)phosphate, and pentabromophenylallylether.

The hydroxycarboxylic acid based polyester composition of the present invention may comprise a lubricant or wax incorporated therein in an amount of from 0.01 to 5 parts by weight based on 100 parts by weight thereof. Specific examples of the lubricant or wax employable herein include paraffin such as paraffin oil and solid paraffin, higher fatty acid such as stearic acid and palmitic acid, higher alcohol such as palmityl alcohol and stearyl alcohol, metal salt of fatty acid such as calcium stearate, zinc stearate, barium stearate, aluminum stearate, magnesium stearate and sodium palmitate, fatty acid ester such as butyl stearate, glycerin monostearate and diethylene glycol monostearate, ethylenediamide such as stearamide, methylenebisstearamide, ethylenebisstearamide and oxystearic acid, fatty acid amide such as methylolamide, oleylamide and erucylamide, wax such as carnauba wax and montan wax, and mixture thereof. The hydroxycarboxylic acid based polyester composition of the present invention may further comprise a known common colorant, crystallization accelerator, etc. incorporated therein.

Apparatus for producing the expanded material of the present invention, particularly foamed sheet, will be described hereinafter.

Examples of foaming extruder for use in the production of foamed sheet by extrusion foaming include single-screw foaming extruder, and tandem foaming extruder comprising two single-screw extruders connected in tandem. In the tandem foaming extruder, a resin is melted and a blowing agent is pressed into and mixed in the resin at the first stage. At the second stage, the mixture is uniformly cooled to a temperature range where it is not solidified.

The foaming extruder to be used in the preparation of the expanded material of the present invention may be a single-screw extruder but is preferably a tandem foaming extruder in particular. The single-screw extruder, if used, is preferably arranged such that one screw functionally corresponds to two tandem foaming extruders. In other words, the single-screw extruder is preferably arranged to provide efficient supply and melting of resin, pressing and blending of blowing agent and cooling of material.

Referring further to the arrangement of the foaming extruder, a ring for inhibiting gas leak toward the hopper and a ring for inhibiting the back flow of resin from the die are preferably provided before and after the gas intake. Further, a pin for providing uniform mixing is preferably provided between the two rings. The flight is preferably provided with a cut in the mixing zone. A dulmage is preferably provided in the vicinity of the final portion of the screw for the purpose of providing thorough mixing.

As the die to be provided at the output end of the extruder there may be used any of circular die, T-die, etc. depending on the purpose. In order to heat the cylinder and die, an electric heater may be used. Alternatively, oil heating may be employed. The die and the cylinder in the vicinity of the die are preferably heated by an oil in a jacket provided thereon so that the temperature can be accurately controlled.

In order to provide a high expansion ratio and hence obtain a high quality expanded material, the resin extruded from the die is preferably cooled rapidly in the stage of expansion so that the scattering of the blowing agent can be prevented. To this end, a cooling apparatus is preferably provided after the extruder. The cooling of the resin can be accomplished by spraying gas such as air and nitrogen onto the resin, passing the resin through a liquid such as water and cooling medium or spraying such a liquid onto the resin. In particular, the air spray method is preferably employed to maintain the desired quality of the expanded material.

If a circular die is used, a mandrel, a cutter, a haul-off equipment and a winder may be provided to wind the material in a roll. In the preparation of the expanded material of the present invention, the starting material such as hydroxycarboxylic acid based polyester and nucleating agent is previously dried before being supplied. In order to prevent the starting material from absorbing water again, the feeder and the hopper of the extruder are preferably filled with a dried atmosphere such as dried nitrogen. A dehumidifying drier is preferably connected to the extruder so that the starting material which is thus dried free from the atmosphere can be supplied into the extruder. The foamed sheet thus obtained may be used as it is or may be secondary processed by a vacuum forming machine, pressure forming machine or the like to obtain a desired formed product.

Besides the foregoing process which comprises pressing a volatile foaming agent into the molten resin in the extruder so that the resin is impregnated with the foaming agent, and then allowing the resin to expand at the output end of the extruder to provide an expanded material in a continuous manner, other processes may be used. For example, the expanded material of hydroxycarboxylic acid based polyester of the present invention can be obtained by a process which comprises preparing a bead-like hydroxycarboxylic acid based polyester impregnated with a blowing agent or having a blowing agent dispersed therein, and then allowing the polyester to expand in a mold on heating by steam or heater or extrusion-foamed by an extruder. Alternatively, a mixture of a hydroxycarboxylic acid based polyester and a decomposable blowing agent may be heat-expanded in a press.

The extrusion temperature depends on the molecular weight and kind of the hydroxycarboxylic acid based polyester used, the residual volatile matter, and the kind and amount of the volatile foaming agent. The cylinder temperature before the pressing of the blowing agent is normally from 120° C. to 250° C., preferably from 140° C. to 200° C. The cylinder temperature after the pressing of the blowing agent is normally from 80° C. to 180° C., preferably from 90° C. to 160° C. The temperature of the extruder at the die, i.e., output end is normally from 80° C. to 160° C., preferably from 90° C. to 140° C. However, if a high decomposable blowing agent is used, it is necessary that the resin be heated to a temperature at which the decomposable blowing agent is decomposed, normally from 200° C. to 240° C.

The hydroxycarboxylic acid based polyester of the present invention can be expanded at a high ratio. The expanded material thus obtained can be fairly formed. The expanded material thus formed has excellent impact resistance, heat resistance and storage stability and thus is used in the art of packaging such as tray, lunch box, food container, beverage container, and agricultural and marine product box, agricultural sheet such as insulating/dewproofing sheet, building material such as synthetic timber and panel and cushioning material such as toy, precision machine and appliance.

The hydroxycarboxylic acid based polyester expanded material obtained according to the present invention exhibits a good biodegradability. When discarded into soil or into the sea, it undergoes hydrolysis or decomposition by microorganism. The hydroxycarboxylic acid based polyester expanded material deteriorates in from several months to one year in the sea. The hydroxycarboxylic acid based polyester expanded material then has a reduced strength. As time passes further, the hydroxycarboxylic acid based polyester expanded material is decomposed to an extent such that the original shape thereof is destroyed.

The laminate of the present invention comprises the expanded material of the present invention and a biodegradable non-expanded material layer. The expanded material to be used in the laminate of the present invention has been described hereinabove. The biodegradable non-expanded material layer to be used as the non-expanded material layer of the present invention is not specifically limited except that it must be biodegradable. Any hydroxycarboxylic acid based polyester comprising, for example, polylactic acid or starch may be used. However, the thermal expansion coefficient of the expanded material layer is preferably close to that of the non-expanded material layer from the standpoint of the use or preparation method of laminate. Further, the composition of the expanded material layer and the non-expanded material layer are preferably alike from the standpoint of adhesion. Accordingly, the expanded material layer and the non-expanded material layer are preferably composed of analogous components.

Therefore, a laminate of the expanded material of the present invention with a non-expanded material layer made of a hydroxycarboxylic acid based polyester having a weight-average molecular weight of from 20,000 to 400,000 comprising as structural units a structural unit derived from hydroxycarboxylic acid, a structural unit derived from molecular weight increasing agent and/or a structural unit derived from polymerization catalyst deactivator or a laminate of a non-expanded material layer made of a lactic acid based polyester having a weight-average molecular weight of from 20,000 to 400,000 comprising from 40 to 95 parts by weight of a structural unit derived from lactic acid and from 5 to 60 parts by weight of a polyester structural unit derived from dicarboxylic acid and diol is desirable.

Further, a laminate of a non-expanded material layer comprising a structural unit derived from lactic acid and a polyester structural unit derived from dicarboxylic acid and diol wherein a part or whole of the polyester structural unit derived from dicarboxylic acid and/or diol has a $C_{1-10}$ alkyl branched chain is excellent in transparency and thus is desirable.

The non-expanded material layer is preferably in the form of a crystal formed by heat treatment at a temperature of from not lower than its glass transition temperature to lower than its melting point.

The expanded material layer to be incorporated in the laminate of the present invention may be made of the foregoing expanded material. Alternatively, a polylactic acid and copolymer thereof, particularly a lactic acid based polyester comprising a structural unit derived from lactic acid and a polyester structural unit derived from dicarboxylic acid and diol, a polyhydroxy butyrate and copolymer thereof, a mixture of a polycaprolactone, polymer thereof and starch, a blend of these polymers or a blend of these polymers with other polymers may be used.

The preparation of the laminate comprising a non-expanded material layer and an expanded material layer can be accomplished by dry lamination using an adhesive, extrusion lamination which comprises topping a polymer extruded from an extruder onto a base, thermal lamination by thermal adhesion, hot-melt lamination which comprises applying a hot-melt to the adherend surface to be subjected to thermal adhesion, or the like. In the present invention, any of these methods may be used. Examples of the thermal lamination apparatus include roll and press. The non-expanded material layer which has thus been oriented can be used to obtain a laminate having an enhanced impact resistance.

As the adhesive for use in dry lamination there may be used a solvent type adhesive or solventless adhesive. Either of these adhesives may be selected depending on the resin used. Specific examples of the adhesive include vinyl adhesive, acrylic adhesive, polyamide adhesive, epoxy adhesive, rubber adhesive, and urethane adhesive.

The laminate comprising a non-expanded material layer made of a lactic acid component as a hydroxycarboxylic acid component has a transparent non-expanded material layer and is advantageous in that the printed surface can be clearly viewed from outside. The printing may be made on the non-expanded material layer before or after the formation of the laminate. The non-expanded material on which printing has been made may be laminated with an expanded material in such an arrangement that the printed surface of the non-expanded material is disposed inside the laminate and thus can be protected. The laminate of the present invention can be formed by vacuum pressure forming or the like into a shape such as food tray and lunch box. The laminate of the present invention can also be used as a cushioning material or insulating material.

The lactic acid based polyester layer of the present invention may be kept at its crystallization temperature before or after lamination (annealing) to enhance its heat resistance. If the heat treatment temperature for crystallization exceeds the melting temperature, the lactic acid based polyester layer is melted and thus cannot be crystallized. On the contrary, if the heat treatment temperature falls below the glass transition temperature, the high molecular chain remains fixed, and the crystallization doesn't proceed. Therefore, the non-expanded material layer to be used in the present invention is preferably in the form of a crystal formed by heat treatment at a temperature of from not lower than its glass transition temperature to lower than its melting point.

The glass transition temperature as referred to herein is measured by DSC (differential scanning calorimeter). The melting point indicates the temperature at which the polymer is completely melted. The heat treatment for crystallization can be accomplished by many methods. For example, the temperature may be raised from a point not higher than glass transition temperature to a point between not lower than glass transition temperature and lower than melting point where it is kept. Alternatively, the temperature may be lowered from the point at which the resin stays molten to a point between lower than melting point and not lower than glass transition temperature where it is kept. Either method may be used. From the standpoint of enhancement of heat resistance, the crystallinity is not less than 5%, preferably not less than 10%, more preferably not less than 20%.

The use of the lactic acid based polyester comprising a structural unit derived from lactic acid and a polyester structural unit derived from dicarboxylic acid and diol wherein a part or whole of the polyester structural unit derived from dicarboxylic acid and/or diol has a $C_{1-10}$ alkyl branched chain as a non-expanded material layer provides the crystallized non-expanded material layer having a higher transparency than the use of a polyester component free of branched chain. In this arrangement, print inside the laminate can be clearly viewed. The resulting laminate has an excellent heat resistance. Thus, such a lactic acid based polyester is particularly preferred.

A polyester component free of alkyl branched chain is inferior to one having an alkyl branched chain in transparency after crystallization. The alkyl branched chain has from 1 to 10 carbon atoms, preferably from 1 to 5 carbon atoms. If the alkyl branched chain has not less than 11 carbon atoms, the resulting polyester disadvantageously has a reduced biodegradability.

The molecular weight as referred to herein is measured by gel permeation chromatography and represented in polystyrene equivalence.

The expanded material and laminate foam according to the present invention has an excellent biodegradability and the same strength and stability as expanded material and laminate foam comprising a general-purpose polymer and thus can be effectively used as packaging materials which are bulky and can be hardly recovered and recycled after use.

The present invention will be further described in the following examples and comparative examples. The term "parts" as used hereinafter is by weight unless otherwise specified. The molecular weight, residual lactide content, melting point, thermal stability, expansion ratio, moldability, drop strength, biodegradability and storage stability were measured by the following methods:

The molecular weight is measured by gel permeation chromatography (GPC) as calculated in terms of polystyrene. The residual lactide content was measured by high performance liquid chromatography. For the measurement of the melting point, a differential scanning type calorimeter DSC-200 available from Seiko Corp. was used. The measurement of melting point was effected at a heating rate of 10° C./min. The melting point was determined from the resulting melting-endothermic curve.

For the measurement of the thermal stability, a 2 mm$\phi$×3 mm pellet was allowed to stand at a temperature of 220° C. under a pressure of 5 torr for 10 minutes. The drop of weight and molecular weight was determined to evaluate the thermal stability.

For the evaluation of expansion ratio, a foamed sheet obtained by foaming extrusion was used.

For the evaluation of moldability, the foamed sheet was formed in a lunch box mold (length: 225 mm; width: 165 mm; depth: 35 mm) consisting of an upper mold and a lower mold which form a pair by means of a one-shot vacuum forming machine available from Sanwa kogyo K.K. at a mold temperature of 35° C. and an upper table heater temperature of 400° C. free from lower table heater to form a lunch box-like container. The formed product thus obtained was evaluated according to the following 4-step criterion:

A: No deformation and distortion observed

B: Slight deformation and distortion observed

C: Some deformation and distortion observed

D: Significant deformation and distortion observed

For the evaluation of drop strength, the foamed sheet was formed into a lunch box (length: 225 mm; width: 165 mm; depth: 35 mm). In the lunch box thus formed was charged a content. The lunch box was then dropped onto a tile from a height of 1.5 m. The lunch box was then examined for damage. The damage was evaluated according to the following 4-step criterion:

A: No damage observed

B: Little damage observed

C: Some damage observed

D: Significant damage observed

For the biodegradability test, Type 100 Tombo Miracle Compo (100-l composting container available from Shinki Gosei K.K.) was used. 50 kg of a garbage was put in the composting container. A 10 cm×10 cm sheet specimen was then put on the garbage. Another garbage was then accumulated on the specimen to a thickness of about 5 cm. The garbage was then sprinkled with 500 g of Newkusaminon (fermentation accelerator available from Aron Kasei Co., Ltd.). The arrangement was installed outdoors. After 1 month, the specimen was withdrawn. The condition of the specimen was evaluated according to the following 4-step criterion:

A: Found ragged to an extent such that the original shape is destroyed

B: The specimen is kept in its original shape but looks white and becomes brittle C: No change in the external shape, little strength drop D: No change For the measurement of storage stability, the foamed sheet specimen was allowed to stand at a temperature of 23° C. and a humidity of 50% for 3 months. The drop of molecular weight was determined to evaluate storage stability.

REFERENCE EXAMPLE 1

1 mol equivalent of a dicarboxylic acid and 1.3 mol equivalents of a diol were charged in a reaction vessel. The reaction mixture was then heated in an atmosphere of nitrogen at a rate of 10° C. per hour from 150° C. The temperature was raised to 220° C. while the resulting water was being distilled off. When the distillation of water was terminated, 70 ppm of titanium tetraisopropoxide was added to the reaction system as an ester interchange catalyst. The reaction system was then allowed to undergo polycondensation reaction by deglycolation for 4 hours while the pressure was being reduced to 0.5 torr. After the distillation of glycol was terminated, the reaction system was allowed to undergo reaction at a temperature of 230° C. for 1 hour to obtain a polyester.

REFERENCE EXAMPLE 2

1 mol equivalent of a dicarboxylic acid and 1.3 mol equivalents of a diol were charged in a reaction vessel. The reaction mixture was then heated in an atmosphere of nitrogen at a rate of 10° C. per hour from 150° C. The temperature was raised to 220° C. while the resulting water was being distilled off. When the distillation of water was terminated, 70 ppm of titanium tetraisopropoxide was added to the reaction system as an ester interchange catalyst. The reaction system was then allowed to undergo polycondensation reaction by deglycolation for 4 hours while the pressure was being reduced to 0.5 torr. After the distillation of glycol was terminated, the reaction system was allowed to undergo reaction at a temperature of 230° C. for 1 hour. A molecular weight increasing agent was then added to the reaction system. The reaction system was then allowed to undergo reaction for 1 hour to obtain a polyester.

REFERENCE EXAMPLE 3

80 parts of Biopol D-310G (available from Zeneca), 20 parts of a polyester (succinic acid: 50 mol-%; butane-1,4-diol: 50 mol-%; weight-average molecular weight: 45,000) obtained according to the preparation process in Reference Example 1 and 0.3 parts of trimellitic anhydride were blended. The blend was supplied into a vented twin-screw extruder which had been adjusted to 180° C. and then melt-blended. The product thus obtained was then pelletized. The resulting hydroxycarboxylic acid based polyester had a weight-average molecular weight of 165,000. The product apparently looked semi-opaque. The product also had a melting point of 165° C. The drop of weight and molecular weight at the thermal stability test were 2% and 3%, respectively. Thus, the hydroxycarboxylic acid based polyester thus obtained exhibited an excellent stability.

REFERENCE EXAMPLE 4

95 parts of L-lactide, 5 parts of D, L-lactide, and parts of toluene as a solvent were mixed. The mixture was melt-blended at a temperature of 170° C. in an atmosphere of inert gas for 1 hour. To the reaction mixture was then added 0.03 part of tin octanoate as an esterification catalyst. The reaction mixture was then allowed to undergo reaction at a temperature of 175° C. for 6 hours. After the completion of the reaction, 0.2 part of hexamethylene diisocyanate were added to the reaction system at a temperature of 130° C. The reaction mixture was then stirred for 20 minutes. Thereafter, the reaction system was heated to a temperature of 200° C. and then devolatilized under a pressure of 5 torr. The product thus obtained was then pelletized. The resulting polylactic acid had a weight-average molecular weight of 181,000. The product apparently looked light-yellowish and transparent and was odorless. The product had a residual lactide content of 0.6%. The product exhibited a melting point of 160° C.

and showed a weight and molecular weight drop of 3% and 1%, respectively, at the thermal stability test. Thus, the product showed an excellent stability.

REFERENCE EXAMPLE 5

98 parts of L-lactide, 2 parts of D-lactide, and 15 parts of toluene as a solvent were mixed. The mixture was melt-blended at a temperature of 170° C. in an atmosphere of inert gas for 1 hour. To the reaction mixture were then added 0.03 part of tin octanoate as an esterification catalyst. The reaction mixture was then allowed to undergo reaction at a temperature of 175° C. for 6 hours. At the same temperature, to the reaction system was then added 0.3 part of pyromellitic anhydride. The reaction mixture was then stirred for 20 minutes. Thereafter, the reaction system was heated to a temperature of 200° C. and then devolatilized under a pressure of 5 torr. The product thus obtained was then pelletized.

80 parts of the pellet thus obtained and 20 parts of the polyester (succinic acid: 50 mol-%; butane-1,4-diol: 50 mol-%; weight-average molecular weight: 45,000) obtained according to the preparation process in Reference Example 1 were then blended. The blend was supplied into a vented twin-screw extruder which had been adjusted to a temperature of 180° C. and melt-blended. The product thus obtained was then pelletized. The resulting lactic acid based polyester had a weight-average molecular weight of 139,000. The product apparently looked light-yellowish and transparent and was odorless. The product had a residual lactide content of 0.7%. The product exhibited a melting point of 162° C. and showed a weight and molecular weight drop of 3% and 1%, respectively, at the thermal stability test. Thus, the product showed an excellent stability.

REFERENCE EXAMPLE 6

95 parts of L-lactide, 5 parts of glycolide, and 15 parts of toluene as a solvent were mixed. The mixture was melt-blended at a temperature of 170° C. in an atmosphere of inert gas for 1 hour. To the reaction mixture was then added 0.03 part of tin octanoate as an esterification catalyst. The reaction mixture was then allowed to undergo reaction at a temperature of 175° C. for 6 hours. The reaction system was devolatilized, and then pelletized. 100 parts of the pellet thus obtained were then blended with 0.3 part of trimellitic anhydride and 0.3 part of ethylenediaminetetraacetic acid. The blend was supplied into a vented twin-screw extruder which had been adjusted to a temperature of 180° C. and then devolatilized with melting and blending under a pressure of 5 torr. The product thus obtained was then pelletized.

The resulting lactic acid based polyester had a weight-average molecular weight of 156,000. The product apparently looked light-yellowish and transparent and was odorless. The product had a residual lactide content of not more than 0.1%. The product exhibited a melting point of 150° C. and showed a weight and molecular weight drop of not more than 1% at the thermal stability test. Thus, the product showed an extremely excellent stability.

REFERENCE EXAMPLE 7

95 parts of L-lactide, 5 parts of D, L-lactide, and parts of toluene as a solvent were mixed. The mixture was melt-blended at a temperature of 170° C. in an atmosphere of inert gas for 1 hour. To the reaction mixture was then added 0.03 part of tin octanoate as an esterification catalyst. The reaction mixture was then allowed to undergo reaction at a temperature of 175° C. for 6 hours. The reaction system was devolatilized, and then pelletized. 100 parts of the pellet thus obtained were then blended with 0.1 part of a mixture of monohexadecyl phosphate and dihexadecyl phosphate. The blend was supplied into a vented twin-screw extruder which had been adjusted to a temperature of 180° C. and then devolatilized with melting and blending under a pressure of 5 torr. The product thus obtained was then pelletized.

The resulting lactic aced based polyester had a weight-average molecular weight of 157,000. The product apparently looked light-yellowish and transparent and was odorless. The product had a residual lactide content of not more than 0.1%. The product exhibited a melting point of 160° C. and showed a weight and molecular weight drop of not more than 1% at the thermal stability test. Thus, the product showed an extremely excellent stability.

REFERENCE EXAMPLE 8

To 20 parts of the polyester (terephthalic acid: 25 mol-%; isophthalic acid: 25 mol-%; ethylene glycol: 20 mol-%; neopentyl glycol: 30 mol-%; weight-average molecular weight: 55,400) obtained according to the preparation process in Reference Example 1 were added 78 parts of L-lactide and 2 parts of D-lactide. The mixture was melt-blended at a temperature of 170° C. in an atmosphere of inert gas for 1 hour. To the reaction mixture were then added 0.04 part of tin octanoate as an esterification catalyst. The reaction mixture was then allowed to undergo reaction at the same temperature for 6 hours. The reaction system was devolatilized, and then pelletized.

100 parts of the pellet thus obtained were then blended with 0.1 part of pyrophosphoric acid. The blend was supplied into a vented twin-screw extruder which had been adjusted to a temperature of 180° C. and then devolatilized with melting and blending under a pressure of 5 torr. The product thus obtained was then pelletized. The resulting lactic acid based polyester had a weight-average molecular weight of 135,000. The product apparently looked light-yellowish and transparent and was odorless. The product had a residual lactide content of 0.2%. The product exhibited a melting point of 158° C. and showed a weight and molecular weight drop of 1% at the thermal stability test. Thus, the product showed an extremely excellent stability.

REFERENCE EXAMPLE 9

98 parts of L-lactide, 2 parts of D-lactide, and 15 parts of toluene as a solvent were mixed. The mixture was melt-blended at a temperature of 170° C. in an atmosphere of inert gas for 1 hour. To the reaction mixture was then added. 0.03 part of tin octanoate as an esterification catalyst. The reaction mixture was then allowed to undergo reaction at a temperature of 175° C. for 6 hours. The reaction system was devolatilized, and then pelletized. 70 parts of the pellet thus obtained were then blended with 30 parts of the polyester (dodecadicarboxylic acid: 40 mol-%; adipic acid: 10 mol-%; hexamethylene glycol: 50 mol-%; weight-average molecular weight: 45,000) obtained according to the preparation method in Reference Example 1, 0.5 part of aluminum isopropoxide and 0.1 part of citric acid. The blend was supplied into a vented twin-screw extruder which had been adjusted to a temperature of 180° C. and then devolatilized with melting and blending under a pressure of 5 torr. The product thus obtained was then pelletized.

The resulting lactic acid based polyester had a weight-average molecular weight of 121,000. The product apparently looked colorless and transparent and was odorless. The product had a residual lactide content of 0.1%. The product exhibited a melting point of 162° C. and showed a weight and molecular weight drop of 1% at the thermal stability test. Thus, the product showed an extremely excellent stability.

REFERENCE EXAMPLE 10

95 parts of L-lactide, 5 parts of D-lactide, and 15 parts of toluene as a solvent were mixed. The mixture was melt-blended at a temperature of 170° C. in an atmosphere of inert gas for 1 hour. To the reaction mixture was then added 0.03 part of tin octanoate as an esterification catalyst. The reaction mixture was then allowed to undergo reaction at a temperature of 175° C. for 6 hours. The reaction system was devolatilized, and then pelletized. 85 parts of the pellet thus obtained were then blended with 15 parts of the polyester (azelaic acid: 50 mol-%; ethylene glycol: 50 mol-%; weight-average molecular weight: 42,000) obtained according to the preparation method in Reference Example 1 and 0.2 part of a mixture of monododecyl phosphate and didodecyl phosphate. The blend was supplied into a vented twin-screw extruder which had been adjusted to a temperature of 180° C. and then devolatilized. The product thus obtained was then pelletized.

The pellet thus obtained was dissolved in chloroform, precipitated in methanol, withdrawn by filtration, and then devolatilized at a temperature of 200° C. under a pressure of 5 torr. The resulting lactic acid based polyester had a weight-average molecular weight of 138,000. The product apparently looked light-yellowish and transparent and was odorless. The product had a residual lactide content of not more than 0.1%. The product exhibited a melting point of 150° C. and showed a weight and molecular weight drop of not more than 1% at the thermal stability test. Thus, the product showed an extremely excellent stability.

REFERENCE EXAMPLE 11

100 parts of 90% L-lactic acid were subjected to dehydration at a temperature of 150° C. under a pressure of 50 torr for 3 hours. To the reaction system were then added 0.2 part of tin powder. The reaction mixture was then subjected to dehydration at the same temperature under a pressure of 30 torr for 2 hours. To the reaction mixture were then added 350 parts of diphenyl ether as a solvent and 1 part of tin powder. The reaction mixture was then subjected to dehydrocondensation at a temperature of 130° C. under a pressure of 12 torr for 55 hours in a column filled with 100 parts of a molecular sieve which had been arranged such that the solvent distilled under reflux is returned to the system through the molecular sieve. After the completion of the reaction, to the reaction system were added 1.5 parts of trans-cyclohexanediaminetetraacetic acid. The reaction mixture was then stirred for 20 minutes. The resulting polylactic acid was dissolved in chloroform, precipitated in methanol, withdrawn by filtration, and then devolatilized at a temperature of 200° C. under a pressure of 5 torr.

The resulting product had a weight-average molecular weight of 112,000. The product apparently looked light-yellowish and transparent and was odorless. The product had a residual lactide content of not more than 0.1%. The product exhibited a melting point of 169° C. and showed a weight and molecular weight drop of not more than 1% at the thermal stability test. Thus, the product showed an extremely excellent stability.

REFERENCE EXAMPLE 12

3 mol-% of sebacic acid, 4 mol-% of propylene glycol and 94 mol-% of L-lactic acid were charged in a reaction vessel. The reaction mixture was then heated with stirring at a rate of 7° C. per hour from 150° C. in an atmosphere of inert gas. The temperature was then raised to 200° C. while the resulting water was being distilled off. When the distillation of water was terminated, 0.007 part of tetraisopropoxy titanium were added to the reaction system as an ester interchange catalyst. The reaction mixture was then stirred while the pressure was being reduced to 0.5 torr. After the distillation of glycol was terminated, the reaction continued at a temperature of 210° C. for 1 hour.

To 100 parts of the polyester thus obtained were then added 0.2 part of hexamethylene diisocyanate and 0.1 part of a mixture of mono-2-ethylhexyl phosphate and di-2-ethylhexyl phosphate. The reaction mixture was then allowed to undergo reaction at a temperature of 170° C. for 30 minutes. The reaction system was heated to a temperature of 200° C. where it was then devolatilized under a pressure of 5 torr. The resulting lactic acid based polyester had a weight-average molecular weight of 108,000. The product apparently looked light-yellowish and transparent and was odorless. The product had a residual lactide content of not more than 0.1%. The product exhibited a melting point of 146° C. and showed a weight and molecular weight drop of not more than 1% at the thermal stability test. Thus, the product showed an extremely excellent stability.

REFERENCE EXAMPLE 13

96 parts of L-lactide, 4 parts of D-lactide, and 15 parts of toluene as a solvent were mixed. The mixture was melt-blended at a temperature of 170° C. in an atmosphere of inert gas for 1 hour. To the reaction mixture were then added 0.03 part of tin octanoate as an esterification catalyst. The reaction mixture was then allowed to undergo reaction at a temperature of 175° C. for 6 hours. The reaction system was devolatilized, and then pelletized. 100 parts of the pellet thus obtained were then blended with 0.8 part of aluminum isopropoxide and 0.1 part of tartaric acid. The blend was supplied into a vented twin-screw extruder which had been adjusted to a temperature of 180° C. and then devolatilized with melting and blending under a pressure of 5 torr. The product thus obtained was then pelletized.

The resulting lactic acid based polyester had a weight-average molecular weight of 153,000. The product apparently looked colorless and transparent and was odorless. The product had a residual lactide content of 0.1%. The product exhibited a melting point of 154° C. and showed a weight and molecular weight drop of 1% at the thermal stability test. Thus, the product showed an extremely excellent stability.

REFERENCE EXAMPLE 14

To 10 parts of the polyester (methylsuccinic acid: 49 mol-%; maleic anhydride: 1 mol-%; butylene-2,3-diol: 50 mol-%; weight-average molecular weight: 44,000) obtained according to the preparation method in Reference Example 1 were added 90 parts of L-lactide and 15 parts of toluene. The mixture was then melt-blended at a temperature of 170° C. in an atmosphere of inert gas for 1 hour. To the reaction system was then added 0.03 part of tin octanoate as an esterification catalyst. The reaction mixture was allowed to undergo reaction at the same temperature for 6 hours, devolatilized, and then pelletized.

100 parts of the pellet thus obtained were then mixed with 0.5 part of pyromellitic anhydride and 0.4 part of triethylenetetraminehexaacetic acid. The blend was supplied into a vented twin-screw extruder which had been adjusted to a temperature of 180° C. and then melt-blended. The product thus obtained was then pelletized. The pellet thus obtained was dispersed in methanol with stirring at room temperature, separated from methanol, and then dried to remove volatile components therefrom. The resulting lactic acid based polyester had a weight-average molecular weight of 151,000. The product apparently looked light-yellowish and transparent and was odorless. The product had a residual lactide content of not more than 0.1%. The product exhibited a melting point of 168° C. and showed a weight and molecular weight drop of not more than 1% at the thermal stability test. Thus, the product showed an extremely excellent stability.

REFERENCE EXAMPLE 15

70 parts of Biopol D-310G (available from Zeneca) and 30 parts of Placcel H-7 (available from Daicel Chemical Industries, Ltd.) were blended. The blend was supplied into a vented twin-screw extruder which had been adjusted to a temperature of 180° C. and then melt-blended. The product thus obtained was then pelletized. The resulting hydroxycarboxylic acid based polyester had a weight-average molecular weight of 147,000. The product apparently looked semi-opaque. The product exhibited a melting point of 164° C. and showed a weight and molecular weight drop of 2% and 3%, respectively, at the thermal stability test. Thus, the product showed an excellent stability.

REFERENCE EXAMPLE 16

95 parts of L-lactide, 5 parts of ε-caprolactone, and parts of toluene as a solvent were mixed. The mixture was then melt-blended at a temperature of 170° C. in an atmosphere of inert gas for 1 hour. To the reaction system was then added 0.03 part of tin octanoate as an esterification catalyst. The reaction mixture was allowed to undergo reaction at a temperature of 175° C. for 6 hours, devolatilized, and then pelletized. 100 parts of the pellet thus obtained were then blended with 0.4 part of pyromellitic anhydride and 0.2 part of a mixture of monohexadecyl phosphate and dihexadecyl phosphate. The blend was supplied into a vented twin-screw extruder which had been adjusted to a temperature of 180° C. and then melt-blended. The product thus obtained was then pelletized.

The pellet thus obtained was dissolved in chloroform, precipitated in methanol, withdrawn by filtration, and then devolatilized at a temperature of 200° C. under a pressure of 5 torr. The resulting lactic acid based polyester had a weight-average molecular weight of 156,000. The product apparently looked light-yellowish and transparent and was odorless. The product had a residual lactide content of not more than 0.1%. The product exhibited a melting point of 150° C. and showed a weight and molecular weight drop of not more than 1% at the thermal stability test. Thus, the product showed an extremely excellent stability.

REFERENCE EXAMPLE 17

To 5 parts of the polyester (sebacic acid: 50 mol-%; butane-1,4-diol: 50 mol-%; weight-average molecular weight: 46,000) obtained according to the preparation process in Reference Example 1 were added 95 parts of L-lactide and 15 parts of toluene as a solvent. The mixture was then melt-blended at a temperature of 170° C. in an atmosphere of inert gas for 1 hour. To the reaction mixture were then added 0.03 part of tin octanoate as an esterification catalyst. The reaction mixture was then allowed to undergo reaction at the same temperature for 6 hours. The reaction system was devolatilized, and then pelletized.

100 parts of the pellet thus obtained were then blended with 0.3 part of trimellitic anhydride. The blend was supplied into a vented twin-screw extruder which had been adjusted to a temperature of 180° C. and then devolatilized with melting and blending under a pressure of 5 torr. The product thus obtained was then pelletized. The resulting lactic acid based polyester had a weight-average molecular weight of 149,000. The product apparently looked light-yellowish and transparent and was odorless. The product had a residual lactide content of 0.6%. The product exhibited a melting point of 169° C. and showed a weight and molecular weight drop of 3% and 1%, respectively, at the thermal stability test. Thus, the product showed an excellent stability.

REFERENCE EXAMPLE 18

To 30 parts of the polyester (azelaic acid: 50 mol-%; ethylene glycol: 50 mol-%; hexamethylene diisocyanate: 0.2%; polyester comprising azelaic acid and ethylene glycol; weight-average molecular weight: 116,000) obtained according to the preparation process in Reference Example 2 were added 30 parts of L-lactide and 15 parts of toluene as a solvent. The mixture was then melt-blended at a temperature of 170° C. in an atmosphere of inert gas for 1 hour. To the reaction mixture were then added 0.03 part of tin octanoate as an esterification catalyst. The reaction mixture was then allowed to undergo reaction at the same temperature for 6 hours. The reaction system was heated to a temperature of 200° C. and then devolatilized under a pressure of 5 torr. The product thus obtained was then pelletized.

The resulting lactic acid based polyester had a weight-average molecular weight of 150,000. The product apparently looked light-yellowish and transparent and was odorless. The product had a residual lactide content of 0.5%. The product exhibited a melting point of 169° C. and showed a weight and molecular weight drop of 3% and 1%, respectively, at the thermal stability test. Thus, the product showed an excellent stability.

REFERENCE EXAMPLE 19

To 15 parts of the polyester (sebacic acid: 50 mol-%; polypropylene glycol having a molecular weight of 1,000: 25 mol-%; weight-average molecular weight: 41,000) obtained according to the preparation process in Reference Example 2 were added 85 parts of L-lactide and 15 parts of toluene as a solvent. The mixture was then melt-blended at a temperature of 170° C. in an atmosphere of inert gas for 1 hour. To the reaction mixture was then added 0.03 part of tin octanoate as an esterification catalyst. The reaction mixture was then allowed to undergo reaction at the same temperature for 6 hours. The reaction system was devolatilized, and then pelletized.

100 parts of the pellet thus obtained were then blended with 0.3 part of pyromellitic anhydride and 0.1 part of a mixture of monododecyl phosphate and didodecyl phosphate. The blend was supplied into a vented twin-screw extruder which had been adjusted to a temperature of 180° C. and then devolatilized with melting and blending under a pressure of 5 torr. The product thus obtained was then pelletized. The resulting lactic acid based polyester had a weight-average molecular weight of 144,000. The product apparently looked light-yellowish and transparent and was odorless. The product had a residual lactide content of not more than 0.1%. The product exhibited a melting point of 167° C. and showed a weight and molecular weight drop of not more than 1% at the thermal stability test. Thus, the product showed an extremely excellent stability.

EXAMPLE 1

With 100 parts of the hydroxycarboxylic acid based polyester obtained in Reference Example 3 were blended 2 parts of talc as a nucleating agent and 0.2 part of magnesium stearate in a tumbling mixer filled with a nitrogen atmosphere. The blend was then extruded at a discharge rate of 15 kg/hr from a 40 mmφ foaming extruder having a screw L/D of 45 and a compression rate of 2.87 and comprising a gas leak preventive ring. Using a high pressure micropump, an alternative fluorocarbon R-134a was pressed into the reaction system at the middle point on the extruder as a blowing agent at a flow rate of 3 parts based on 100 parts of the hydroxycarboxylic acid based polyester.

The extruder cylinder temperature was predetermined to from 160° C. to 170° C. (230° C. if a decomposable blowing agent comprising citric acid, sodium bicarbonate and a binder is used). The die temperature was predetermined to from 120° C. to 130° C. The resin discharged from the cylindrical die was circumferentially sprayed with compressed air from a cooling air ring so that the surface of the foamed sheet thus discharged was cooled. The foamed sheet was then put around a mandrel. The foamed sheet was then expanded from inside by compressed air at a blow-up ratio of 2.83. The foamed sheet was continuously cut in the extrusion direction by means of a cutter disposed under the mandrel to produce a sheet which was then passed through a haul-off equipment and wound. Thereafter, the sheet was evaluated for moldability, drop strength, biodegradability and storage stability. The foamed sheet thus obtained was then measured for thickness and expansion ratio. The results are set forth in Table 1.

EXAMPLES 2 TO 6

The procedure of Example 1 was followed to prepare and evaluate foamed sheets except that the hydroxycarboxylic acid based polyesters obtained in Reference Examples 4 to 8 were used as hydroxycarboxylic acid based polyesters. The results are set forth in Table 1.

EXAMPLE 7

The procedure of Example 1 was followed to prepare and evaluate a foamed sheet except that the lactic acid based polyester obtained in Reference Example 9 was used as a hydroxycarboxylic acid based polyester and a 75/25% mixture of n-pentane and iso-pentane was used as a blowing agent. The results are set forth in Table 1.

EXAMPLES 8 AND 9

The procedure of Example 7 was followed to prepare and evaluate foamed sheets except that the lactic acid based polyesters obtained in Reference Examples 10 and 11 were used as hydroxycarboxylic acid based polyesters. The results are set forth in Table 1.

EXAMPLE 10

The procedure of Example 1 was followed to prepare and evaluate a foamed sheet except that 85 parts of the lactic acid based polyester obtained in Reference Example 12 were blended with 2 parts of calcium carbonate as a nucleating agent, 0.2 part of magnesium stearate, and 15 parts of the polyester (sebacic acid: 50 mol-%; butane-1,4-diol: 50 mol-%; weight-average molecular weight: 46,000) obtained according to the preparation process in Reference Example 1 in a tumbling mixer filled with a nitrogen atmosphere. The results are set forth in Table 1.

EXAMPLES 11 AND 12

The procedure of Example 10 was followed to prepare and evaluate foamed sheets except that the lactic acid based polyesters obtained in Reference Examples 13 and 14 were used as hydroxycarboxylic acid based polyesters. The results are set forth in Table 1.

EXAMPLE 13

The procedure of Example 1 was followed to prepare and evaluate a foamed sheet except that 80 parts of the hydroxycarboxylic acid based polyester obtained in Reference Example 15 were blended with 2 parts of calcium carbonate as a nucleating agent, 0.2 part of magnesium stearate, 20 parts of the polyester (sebacic acid: 50 mol-%; butane-1,4-diol: 50 mol-%; weight-average molecular weight: 46,000) obtained according to the preparation process in Reference Example 1, and 0.1 part of a mixture of monododecyl phosphate and didodecyl phosphate in a tumbling mixer filled with a nitrogen atmosphere. The results are set forth in Table 1.

EXAMPLE 14

The procedure of Example 1 was followed to prepare and evaluate a foamed sheet except that 80 parts of the lactic acid based polyester obtained in Reference Example 16 were blended with 2 parts of talc as a nucleating agent, 0.2 part of magnesium stearate, and 20 parts of the polyester (azelaic acid: 50 mol-%; ethylene glycol: 50 mol-%; hexamethylene diisocyanate: 0.2%; polyester comprising azelaic acid and ethylene glycol; weight-average molecular weight: 116,000) obtained according to the preparation process in Reference Example 2 in a tumbling mixer filled with a nitrogen atmosphere. The results are set forth in Table 1.

EXAMPLE 15

The procedure of Example 1 was followed to prepare and evaluate a foamed sheet except that 85 parts of the lactic acid based polyester obtained in Reference Example 17 were blended with 2 parts of talc as a nucleating agent, 0.2 part of magnesium stearate, 5 parts of Placcel H-7 (available from Daicel Chemical Industries, Ltd.), 10 parts of the polyester (azelaic acid: 50 mol-%; ethylene glycol: 50 mol-%; hexamethylene diisocyanate: 0.2%; polyester comprising azelaic acid and ethylene glycol; weight-average molecular weight: 116,000) obtained according to the preparation process in Reference Example 2, and 0.5 part of aluminum isopropoxide in a tumbling mixer filled with a nitrogen atmosphere. The results are set forth in Table 1.

EXAMPLE 16

The procedure of Example 1 was followed to prepare and evaluate a foamed sheet except that 80 parts of the lactic acid based polyester obtained in Reference Example 18 were blended with 2 parts of talc as a nucleating agent, 0.2 part of magnesium stearate, 20 parts of the polyester (azelaic acid: 50 mol-%; ethylene glycol: 50 mol-%; hexamethylene diisocyanate: 0.2%; polyester comprising azelaic acid and ethylene glycol; weight-average molecular weight: 116,000) obtained according to the preparation process in Reference Example 2, and 0.1 part of monodecylphosphonic acid in a tumbling mixer filled with a nitrogen atmosphere and a 75/25% mixture of n-butane and is-obutane was used as a blowing agent in an amount of 3 parts based on 100 parts of the lactic acid based polyester used. The results are set forth in Table 1.

EXAMPLE 17

The procedure of Example 1 was followed to prepare and evaluate a foamed sheet except that the lactic acid based polyester obtained in Reference Example 19 was used and an alternative fluorocarbon R-134a and azodicarbonamide were used as blowing agents in an amount of 3 parts and 1 part based on 100 parts of the lactic acid based polyester used, respectively. The results are set forth in Table 1.

EXAMPLE 18

The procedure of Example 4 was followed to prepare and evaluate a foamed sheet except that liquefied carbon dioxide gas was pressed into the foaming extruder as a blowing agent using a high pressure constant rate pump. The results are set forth in Table 1. The diameter of the cells thus obtained was smaller than in Example 4.

EXAMPLE 19

The procedure of Example 5 was followed to prepare and evaluate a foamed sheet except that liquefied carbon dioxide gas was pressed into the foaming extruder as a blowing agent using a high pressure constant rate pump. The results are set forth in Table 1. The diameter of the cells thus obtained was smaller than in Example 5.

EXAMPLE 20

The procedure of Example 3 was followed to prepare and evaluate a foamed sheet except that liquefied carbon dioxide gas was pressed into the foaming extruder as a blowing agent using a high pressure constant rate pump. The results are set forth in Table 1. The diameter of the cells thus obtained was smaller than in Example 3.

EXAMPLE 21

The procedure of Example 12 was followed to prepare and evaluate a foamed sheet except that liquefied carbon dioxide gas was pressed into the foaming extruder as a blowing agent using a high pressure constant rate pump. The results are set forth in Table 1. The diameter of the cells thus obtained was smaller than in Example 12.

EXAMPLE 22

The procedure of Example 8 was followed to prepare and evaluate a foamed sheet except that liquefied carbon dioxide gas was pressed into the foaming extruder as a blowing agent using a high pressure constant rate pump. The results are set forth in Table 1. The diameter of the cells thus obtained was smaller than in Example 8.

EXAMPLE 23

The procedure of Example 15 was followed to prepare and evaluate a foamed sheet except that liquefied carbon dioxide gas was pressed into the foaming extruder as a blowing agent using a high pressure constant rate pump. The results are set forth in Table 1. The diameter of the cells thus obtained was smaller than in Example 15.

EXAMPLE 24

The procedure of Example 12 was followed to prepare and evaluate a foamed sheet except that liquefied carbon dioxide gas was pressed into the foaming extruder as a blowing agent using a high pressure constant rate pump and a decomposable blowing agent (comprising citric acid, sodium bicarbonate and a binder; main decomposition temperature: 200° C. to 210° C.) was further added to the resin with the other additives in an amount of 4 parts based on 100 parts by weight of the lactic acid based polyester. The results are set forth in Table 2. The diameter of the cells thus obtained was smaller than in Example 21.

EXAMPLE 25

The procedure of Example 8 was followed to prepare and evaluate a foamed sheet except that liquefied carbon dioxide gas was pressed into the foaming extruder as a blowing agent using a high pressure constant rate pump and a decomposable blowing agent (comprising citric acid, sodium bicarbonate and a binder; main decomposition temperature: 200° C. to 210° C.) was further added to the resin with the other additives in an amount of 4 parts based on 100 parts by weight of the lactic acid based polyester. The results are set forth in Table 2. The diameter of the cells thus obtained was smaller than in Example 22.

EXAMPLE 26

The procedure of Example 15 was followed to prepare and evaluate a foamed sheet except that liquefied carbon dioxide gas was pressed into the foaming extruder as a blowing agent using a high pressure constant rate pump and a decomposable blowing agent (comprising citric acid, sodium bicarbonate and a binder; main decomposition temperature: 200° C. to 210° C.) was further added to the resin with the other additives in an amount of 4 parts based on 100 parts by weight of the lactic acid based polyester. The results are set forth in Table 2. The diameter of the cells thus obtained was smaller than in Example 23.

COMPARATIVE REFERENCE EXAMPLE 1

The procedure of Reference Example 3 was followed to obtain a hydroxycarboxylic acid based polyester pellet except that trimellitic anhydride was not added. The hydroxycarboxylic acid based polyester pellet thus obtained exhibited a weight-average molecular weight of 137,000. The product apparently looked milk-yellowish. The product exhibited a melting point of 164° C. and showed a weight and molecular weight drop of 11% and 10%, respectively, at the thermal stability test. Thus, the product had a deteriorated thermal stability.

COMPARATIVE REFERENCE EXAMPLE 2

The procedure of Reference Example 6 was followed to obtain a lactic acid based polyester pellet except that trimellitic anhydride and ethylenediaminetetraacetic acid were not added. The lactic acid based polyester pellet thus obtained exhibited a weight-average molecular weight of 123,000. The product apparently looked light-brown and transparent and was odorous. The product had a residual lactide content of 3.8%. The product exhibited a melting point of 148° C. and showed a weight and molecular weight drop of 11% and 9%, respectively, at the thermal stability test. Thus, the product had a deteriorated thermal stability.

COMPARATIVE REFERENCE EXAMPLE 3

The procedure of Reference Example 1 was followed to obtain a lactic acid based polyester pellet except that the mixture of monododecyl phosphate and didodecyl phosphate was not added. The lactic acid based polyester pellet thus obtained exhibited a weight-average molecular weight of 109,000. The product apparently looked light-brown and transparent and was odorous. The product had a residual lactide content of 3.7%. The product exhibited a melting point of 148° C. and showed a weight and molecular weight drop of 12% and 11%, respectively, at the thermal stability test. Thus, the product had a deteriorated thermal stability.

COMPARATIVE REFERENCE EXAMPLE 4

The procedure of Reference Example 12 was followed to obtain a lactic acid based polyester pellet except that hexamethylene diisocyanate and the mixture of mono-2-ethylhexyl phosphate and di-2-ethylhexyl phosphate were not added. The lactic acid based polyester pellet thus obtained exhibited a weight-average molecular weight of 58,000. The product apparently looked light-brown and transparent and was odorous. The product had a residual lactide content of 4.3%. The product exhibited a melting point of 142° C. and showed a weight and molecular weight drop of 13% and 12%, respectively, at the thermal stability test. Thus, the product had a deteriorated thermal stability.

COMPARATIVE REFERENCE EXAMPLE 5

The procedure of Reference Example 19 was followed to obtain a lactic acid based polyester pellet except that pyromellitic anhydride and the mixture of monododecyl phosphate and didodecyl phosphate were not added. The lactic acid based polyester pellet thus obtained exhibited a weight-average molecular weight of 114,000. The product apparently looked light-brown and transparent and was odorous. The product had a residual lactide content of 4.1%. The product exhibited a melting point of 165° C. and showed a weight and molecular weight drop of 13% and 12%, respectively, at the thermal stability test. Thus, the product had a deteriorated thermal stability.

COMPARATIVE EXAMPLE 1

The procedure of Example 1 was followed to prepare and evaluate a foamed sheet except that the hydroxycarboxylic acid based polyester obtained in Comparative Reference Example 1 was used as a hydroxycarboxylic acid based polyester. The results are set forth in Table 3.

COMPARATIVE EXAMPLE 2

The procedure of Example 1 was followed to prepare and evaluate a foamed sheet except that the hydroxycarboxylic acid based polyester obtained in Comparative Reference Example 2 was used as a hydroxycarboxylic acid based polyester. The results are set forth in Table 3.

COMPARATIVE EXAMPLE 3

The procedure of Example 1 was followed to prepare and evaluate a foamed sheet except that the lactic acid based polyester obtained in Comparative Reference Example 3 was used as a hydroxycarboxylic acid based polyester and a 75/25 mixture of n-pentane and iso-pentane was used as a blowing agent. The results are set forth in Table 3.

COMPARATIVE-EXAMPLE 4

The procedure of Example 1 was followed to prepare and evaluate a foamed sheet except that 85 parts of the lactic acid based polyester obtained in Comparative Reference Example 4 were blended with 2 parts of calcium carbonate as a nucleating agent, 0.2 part of magnesium stearate, and 15 parts of the polyester (sebacic acid: 50 mol-%; butane-1,4-diol: 50 mol-%; weight-average molecular weight: 46,000) obtained according to the preparation process in Reference Example 1 in a tumbling mixer filled with a nitrogen atmosphere. The results are set forth in Table 3.

COMPARATIVE EXAMPLE 5

The procedure of Example 1 was followed to prepare and evaluate a foamed sheet except that the lactic acid based polyester obtained in Comparative Reference Example 5 was used as a hydroxycarboxylic acid based polyester and an alternative fluorocarbon R-134a and azodicarbonamide were used as blowing agents in an amount of 3 parts and 1 part based on 100 parts of the lactic acid based polyester used, respectively. The results are set forth in Table 3.

TABLE 1

| Example No. | Thickness of sheet (mm) | Expansion ratio | Moldability | Drop strength | Biodegradability | % Storage stability |
|---|---|---|---|---|---|---|
| 1 | 2.4 | 12 | A | A | A | 2 |
| 2 | 2.5 | 13 | A | A | A | 3 |
| 3 | 2.3 | 11 | B | B | A | 3 |
| 4 | 2.4 | 12 | A | B | A | 1 |
| 5 | 2.4 | 12 | A | B | A | 1 |
| 6 | 2.2 | 11 | A | A | A | 1 |
| 7 | 2.0 | 10 | B | A | A | 1 |
| 8 | 2.2 | 11 | A | B | A | ≦1 |
| 9 | 1.8 | 9 | B | B | B | ≦1 |
| 10 | 1.9 | 9 | B | B | A | 1 |
| 11 | 2.4 | 12 | A | A | A | 1 |
| 12 | 2.4 | 12 | A | A | B | ≦1 |
| 13 | 2.4 | 12 | A | A | A | 2 |
| 14 | 2.4 | 12 | A | A | A | ≦1 |
| 15 | 2.3 | 11 | A | A | A | 3 |
| 16 | 2.4 | 12 | A | A | A | 3 |
| 17 | 2.4 | 12 | A | A | B | 1 |
| 18 | 2.4 | 18 | A | A | A | 1 |
| 19 | 2.4 | 16 | A | A | A | 1 |
| 20 | 2.5 | 15 | B | A | A | 3 |
| 21 | 2.4 | 18 | A | A | B | ≦1 |
| 22 | 2.4 | 15 | A | A | A | ≦1 |
| 23 | 2.4 | 15 | A | A | A | 3 |

TABLE 2

| Example No. | Thickness of sheet (mm) | Expansion ratio | Moldability | Drop strength | Biodegradability | % Storage stability |
|---|---|---|---|---|---|---|
| 24 | 2.4 | 25 | A | A | B | ≦1 |
| 25 | 2.5 | 23 | A | A | A | ≦1 |
| 26 | 2.4 | 22 | A | A | A | 3 |

TABLE 3

| Example No. Comparative Example | Thickness of sheet (mm) | Expansion ratio | Moldability | Drop strength | Biodegradability | % Storage stability |
|---|---|---|---|---|---|---|
| 1 | 1.4 | 7 | C | C | A | 3 |
| 2 | 1.1 | 5 | D | D | A | 14 |
| 3 | 0.9 | 4 | D | D | A | 15 |
| 4 | 0.6 | 2 | D | D | A | 13 |
| 5 | 0.9 | 4 | D | D | A | 13 |

REFERENCE EXAMPLE 20

To 10 parts of an aliphatic polyester (sebacic acid component: 50 mol-%; propylene glycol component: 50 mol-%; weight-average molecular weight: 36,000) were added 90 parts of L-lactide and 15 parts of toluene as a solvent. These components were then melt-blended at a temperature of 170° C. in an atmosphere of inert gas for 1 hour. To the reaction mixture was then added 0.03 part of tin octanoate as a catalyst. The reaction mixture was then allowed to undergo reaction for 5 hours. The reaction product was taken out, cooled, and then pelletized. Volatile components were then removed from the pellet thus obtained at a temperature of 130° C. under a pressure of 1 mmHg. The product exhibited a weight-average molecular weight of 188,000. (The product will be hereinafter referred to as "Polymer A")

REFERENCE EXAMPLE 21

To 30 parts of an aliphatic polyester (sebacic acid component: 50 mol-%; 1,4-butanediol: 50 mol-%; weight-average molecular weight: 46,000) was added 0.15 part of pyromellitic anhydride. The reaction mixture was then allowed to undergo reaction with stirring at a temperature of 200° C. for 1 hour. To the reaction product (weight-average molecular weight: 104,000) were then added 60 parts of L-lactide, 10 parts of D, L-lactide and 15 parts of toluene as a solvent. These components were then melt-blended at a temperature of 170° C. in an atmosphere of inert gas for 1 hour. To the reaction mixture was then added 0.03 part of tin octanoate as a catalyst. The reaction mixture was then allowed to undergo reaction for 6 hours. The reaction product was taken out, cooled, and then pelletized. Volatile components were then removed from the pellet thus obtained at a temperature of 130° C. under a pressure of 1 mmHg. The product exhibited a weight-average molecular weight of 156,000. (The product will be hereinafter referred to as "Polymer B")

REFERENCE EXAMPLE 22

95 parts of a poly-L-lactide (available from Purac Inc.) and 5 parts of a poly-DL-lactide (available from Purac Inc.) were kneaded by a twin-screw extruder, and the product thus obtained was then pelletized. The resulting product exhibited a weight-average molecular weight of 192,000. (The product will be hereinafter referred to as "Polymer C")

REFERENCE EXAMPLE 23

90 parts of Polymer C and 10 parts of ε-caprolactone (TONE P-787, available from Union Carbide Inc.) were kneaded by a twin-screw extruder. (The product will be hereinafter referred to as "Polymer D")

Further, an aliphatic polyester #1010 available from Showa Highpolymer Co., Ltd. (hereinafter referred to as "Polymer E") was used.

REFERENCE EXAMPLE 24

To 10 parts of an aliphatic polyester (sebacic acid component: 50 mol-%; propylene glycol component: 50 mol-%; weight-average molecular weight: 36,000) were added 90 parts of L-lactide and 15 parts of toluene as a solvent. These components were then melt-blended at a temperature of 170° C. in an atmosphere of inert gas for 1 hour. To the reaction mixture was then added 0.03 part of tin octanoate as a catalyst. The reaction mixture was then allowed to undergo reaction for 5 hours. To the reaction system were then added 0.5 part of ethylenediaminetetraacetic acid. The reaction mixture was then stirred for 5 minutes. Volatile components were then removed from the reaction system under reduced pressure while the reaction system was melted. The reaction product was taken out, and then pelletized. The product exhibited a weight-average molecular weight of 246,000. (The product will be hereinafter referred to as "Polymer F")

REFERENCE EXAMPLE 25

To 30 parts of an aliphatic polyester (sebacic acid component: 50 mol-%; propylene glycol component: 50 mol-%; weight-average molecular weight: 36,000) were added 70 parts of L-lactide and 15 parts of toluene as a solvent. These components were then melt-blended at a temperature of 170° C. in an atmosphere of inert gas for 1 hour. To the reaction mixture were then added 0.03 part of tin octanoate as a catalyst. The reaction mixture was then allowed to undergo reaction for 5 hours. To the reaction system was then added 0.05 part of 2-ethylhexyl acid phosphate and 0.3 part of ethylenediaminetetraacetic acid. The reaction mixture was then stirred for 5 minutes. Volatile components were then removed from the reaction system under reduced pressure while the reaction system was melted. The reaction product was taken out, and then pelletized. The product exhibited a weight-average molecular weight of 258,000. (The product will be hereinafter referred to as "Polymer G")

REFERENCE EXAMPLE 26

95 parts of a poly-L-lactide (available from Purac Inc.), 5 parts of a poly-DL-lactide (available from Purac Inc.) and 0.1 part of 2-ethylhexyl acid phosphate were kneaded by a twin-screw extruder, and the product thus obtained was then pelletized. The resulting product exhibited a weight-average molecular weight of 212,000. (The product will be hereinafter referred to as "Polymer H")

REFERENCE EXAMPLE 27

95 parts of a poly-L-lactide (available from Purac Inc.), 5 parts of a poly-DL-lactide (available from Purac Inc.) and 0.5 part of ethylenediaminetetraacetic acid were kneaded by a twin-screw extruder, and the product thus obtained was then pelletized. The resulting product exhibited a weight-average molecular weight of 215,000. (The product will be hereinafter referred to as "Polymer I")

REFERENCE EXAMPLE 28

To 10 parts of an aliphatic polyester (sebacic acid component: 50 mol-%; propylene glycol component: 50 mol-%; weight-average molecular weight: 38,000) were added 0.05 part of pyromellitic anhydride. The reaction mixture was then allowed to undergo reaction with stirring at a temperature of 200° C. for 1 hour. To the reaction product (weight-average molecular weight: 101,000) were then added 90 parts of L-lactide and 15 parts of toluene as a solvent. These components were then melt-blended at a temperature of 170° C. in an atmosphere of inert gas for 1 hour. To the reaction mixture was then added 0.03 part of tin octanoate as a catalyst. The reaction mixture was then allowed to undergo reaction for 5 hours. To the reaction system was then added 0.7 part of 2-ethylhexyl acid phosphate and 0.3 part of pyromellitic anhydride. The reaction mixture was then stirred for 5 minutes. Volatile components were then removed from the reaction system under reduced pressure while the reaction system was melted. The reaction product was taken out, and then pelletized. The product exhibited a weight-average molecular weight of 282,000. (The product will be hereinafter referred to as "Polymer J")

REFERENCE EXAMPLE 29

95 parts of a poly-L-lactide (available from Purac Inc.), 5 parts of a poly-DL-lactide (available from Purac Inc.), 0.7 part of 2-ethylhexyl acid phosphate and 0.3 part of pyromellitic anhydride were kneaded and devolatilized by a vented twin-screw extruder, and the product thus obtained was then pelletized. The resulting product exhibited a weight-average molecular weight of 225,000. (The product will be hereinafter referred to as "Polymer K")

REFERENCE EXAMPLE 30

95 parts of a poly-L-lactide (available from Purac Inc.), 5 parts of a poly-DL-lactide (available from Purac Inc.) and 0.3 part of pyromellitic anhydride were kneaded by a vented twin-screw extruder, and the product thus obtained was then pelletized. The resulting product exhibited a weight-average molecular weight of 221,000. (The product will be hereinafter referred to as "Polymer L")

REFERENCE EXAMPLE 31

To 10 parts of an aliphatic polyester (sebacic acid component: 50 mol-%; ethylene glycol component: 50 mol-%; weight-average molecular weight: 39,000) were added 90 parts of L-lactide and 15 parts of toluene as a solvent. These components were then melt-blended at a temperature of 170° C. in an atmosphere of inert gas for 1 hour. To the reaction mixture was then added 0.03 part of tin octanoate as a catalyst. The reaction mixture was then allowed to undergo reaction for 5 hours. The reaction product was taken out, cooled, and then pelletized. Volatile components were then removed from the pellet thus obtained at a temperature of 130° C. under a pressure of 1 mmHg. The product exhibited a weight-average molecular weight of 188,000 and had a lactide content of 1.8%. (The product will be hereinafter referred to as "Polymer M")

REFERENCE EXAMPLE 32

95 parts of a poly-L-lactide (available from Purac Inc.) and 5 parts of a poly-DL-lactide (available from Purac Inc.) were kneaded and devolatilized by a vented twin-screw extruder, and the product thus obtained was then pelletized. The resulting product exhibited a weight-average molecular weight of 192,000 and had a lactide content of 2.2%. (The product will be hereinafter referred to as "polymer N")

Preparation of Laminate 100 parts of each of dried polymers described in the foregoing reference examples were mixed with 2 parts of talc and 0.2 part of magnesium stearate in a vinyl bag filled with a nitrogen atmosphere.

The mixture was then subjected to extrusion through a 40 mm extruder equipped with a cylindrical dice. The temperature of the cooling zone and the dice was controlled by an oil jacket. The screw used had L/D ratio of 45 and a compression ratio of 2.87, and had a gas leak preventive ring.

The polymer was extruded at a discharge rate of 15 kg/hr. Using a high pressure micropump, an alternative fluorocarbon HFC-134a was pressed into the polymer on the way between input and output at a flow rate of from 1 to 5% by weight based on the weight of the polymer. The polymer temperature was from 140° C. to 170° C. The die temperature was from 100° C. to 140° C.

The polymer was cylindrically extruded from the die, expanded by air which had been blown through the inside thereof, and then circumferentially sprayed with compressed air from a cooling air ring to cool the surface of the foamed sheet. The foamed sheet was then put around a mandrel. The foamed sheet was then expanded from inside by compressed air (blow-up ratio: 2.83). The foamed sheet was continuously cut in the extrusion direction by a cutter disposed under the mandrel to produce a sheet which was then passed through a haul-off equipment and wound.

On the other hand, the dried polymers were each extruded from a 30 mm extruder with a T-die at a temperature of from 180° C. to 190° C. to prepare a film having a width of 28 cm and a thickness of 35 $\mu$m (non-expanded material) which was then wound. A 20 cm wide and 40 cm long rectangular sample was cut from the foamed sheet. Using a lamination apparatus available from Tester Sangyo K.K., the predetermined 20 cm wide and 40 cm long polymer film (non-expanded material) was then laminated on one surface of the expanded material at a temperature of from 110° C. to 120° C. in such an arrangement that the printed surface thereof comes in contact with the expanded material.

Formation of Lunch Box

The laminate thus prepared was subjected to vacuum pressure forming to form a 225 mm long×165 mm wide×35 mm deep lunch box which was then examined for impact resistance, storage stability and biodegradability in the following manner.

Evaluation of Print on the Laminate

Using a sheet-feed press, a pattern was printed on the non-expanded material sheet with an ink for polyester comprising a solvent mainly composed of ethyl acetate and isopropyl alcohol before lamination. The non-expanded material sheet was laminated, and then observed for print conditions through the non-expanded material sheet. The print conditions were evaluated according to the following 4-step criterion:

1: Very clear

2: Clear, good

3: Lacks in clearness

4: Unclear

Evaluation of Heat Resistance of the Laminate

The laminate was subjected to vacuum pressure forming to form a lunch box (225 mm long, 165 mm wide, 35 mm deep). A food rapeseed oil was then poured into the lunch box. The lunch box was then heated in a microwave oven for 3 minutes. The lunch box was then observed for deformation. The degree of deformation was evaluated according to the following 4-step criterion:

1: No deformation

2: Slight deformation

3: Some deformation

4: Deformation

Evaluation of Impact Resistance of the Laminate

For the evaluation of impact resistance, a 300 g (A method) or 350 g (B method) water-filled vinyl bag was put in the foregoing lunch box (225 mm long, 165 mm wide, 35 mm deep) prepared by vacuum pressure forming. The lunch box was then dropped onto a tile from a height of 1.2 m (A method) or 1.7 m (B method). The lunch box was then observed for damage. The damage was then evaluated according to the following 4-step criterion:

1: No damage

2: Little or no damage

3: Slight damage

4: Significant damage

Storage Stability Test

The foregoing lunch box was allowed to stand in a 35° C.—80% RH constant temperature-humidity bath for 4 weeks. The lunch box was subjected to impact resistance test and evaluated in the same manner as described above.

Evaluation of Biodegradability of the Laminate

For the biodegradability test, Type 100 Tombo Miracle Compo (100-1 composting container available from Shinki Gosei K.K.) was used. 50 kg of a garbage was put in the composting container. A square laminate sheet specimen having a side of from 8 to 10 cm was then put on the garbage. Another garbage was then accumulated on the specimen to a thickness of about 5 cm. The garbage was then sprinkled with 500 g of Newkusamninon (fermentation accelerator available from Aron Kasei Co., Ltd.). The arrangement was installed outdoors. After 1 month, the specimen was withdrawn. The condition of the specimen was evaluated according to the following 3-step criterion:

1: Found ragged to an extent such that the original shape is destroyed
2: The specimen is kept in its original shape but becomes brittle
3: No change

EXAMPLE 27

Polymer B was used as an expanded material layer. Polymer A was used as a non-expanded material layer. The non-expanded material layer was then laminated on one surface of the expanded material layer. The results of evaluation of the laminate are set forth in Table 4.

EXAMPLE 28

Polymer B was used as an expanded material layer. Polymer A was used as a non-expanded material layer. These layers were then annealed at a temperature of 100° C. for 10 minutes. The non-expanded material layer was then laminated on one surface of the expanded material layer. The results of evaluation of the laminate are set forth in Table 4.

EXAMPLE 29

Polymer B was used as an expanded material layer. Polymer A was used as a non-expanded material layer. The non-expanded material layer was then laminated on both surfaces of the expanded material layer. The results of evaluation of the laminate are set forth in Table 4.

EXAMPLE 30

Polymer B was used as an expanded material layer. Polymer B was also used as a non-expanded material layer. The non-expanded material layer was then laminated on one surface of the expanded material layer. The results of evaluation of the laminate are set forth in Table 4.

EXAMPLE 31

Polymer B was used as an expanded material layer. Polymer B was also used as a non-expanded material layer. These layers were annealed at a temperature of 100° C. for 10 minutes. The non-expanded material layer was then laminated on one surface of the expanded material layer. The results of evaluation of the laminate are set forth in Table 4.

EXAMPLE 32

Polymer B was used as an expanded material layer. Polymer B was also used as a non-expanded material layer. The non-expanded material layer was then laminated on one surface of the expanded material layer. The laminate was then annealed at a temperature of 100° C. for 15 minutes. The results of evaluation of the laminate are set forth in Table 4.

EXAMPLE 33

Polymer G was used as an expanded material layer. Polymer F was used as a non-expanded material layer. The non-expanded material layer was then laminated on one surface of the expanded material layer. The results of evaluation of the laminate are set forth in Table 4.

EXAMPLE 34

Polymer H was used as an expanded material layer. Polymer H was also used as a non-expanded material layer. The non-expanded material layer was then laminated on one surface of the expanded material layer. The results of evaluation of the laminate are set forth in Table 4.

EXAMPLE 35

Polymer I was used as an expanded material layer. Polymer I was also used as a non-expanded material layer. The non-expanded material layer was then laminated on one surface of the expanded material layer. The results of evaluation of the laminate are set forth in Table 4.

EXAMPLE 36

Polymer G was used as an expanded material layer. Polymer H was used as a non-expanded material layer. The non-expanded material layer was then laminated on one surface of the expanded material layer. The laminate was then annealed at a temperature of 100° C. for 10 minutes. The results of evaluation of the laminate are set forth in Table 4.

EXAMPLE 37

The expanded material layer was prepared by processing 100 parts of Polymer J with 2 parts of a decomposable blowing agent (comprising citric acid, sodium bicarbonate and a binder; main decomposition temperature: 200° C. to 210° C.) and liquefied carbon dioxide gas as a volatile foaming agent. Polymer J was also used as a non-expanded material layer. The non-expanded material layer was annealed at a temperature of 100° C. for 10 minutes, and then laminated on one surface of the expanded material layer. The results of evaluation of the laminate are set forth in Table 4.

EXAMPLE 38

The expanded material layer was prepared by processing 100 parts of Polymer K with 2 parts of a decomposable blowing agent (comprising citric acid, sodium bicarbonate and a binder; main decomposition temperature: 200° C. to 210° C.) and liquefied carbon dioxide gas as a volatile foaming agent. Polymer K was also used as a non-expanded material layer. The non-expanded material layer was then laminated on one surface of the expanded material layer.

The results of evaluation of the laminate are set forth in Table 5.

EXAMPLE 39

The expanded material layer was prepared by processing 100 parts of Polymer L with 2 parts of a decomposable blowing agent (comprising citric acid, sodium bicarbonate and a binder; main decomposition temperature: 200° C. to 210° C.) and liquefied carbon dioxide gas as a volatile foaming agent. Polymer L was also used as a non-expanded material layer. The non-expanded material layer was then laminated on one surface of the expanded material layer. The results of evaluation of the laminate are set forth in Table 5.

COMPARATIVE EXAMPLE 6

Polymer C was used as an expanded material layer. Polymer C was also used as a non-expanded material layer.

The non-expanded material layer was then laminated on both surfaces of the expanded material layer. The results of evaluation of the laminate are set forth in Table 6.

COMPARATIVE EXAMPLE 7

Polymer C was used as an expanded material layer. Polymer D was used as a non-expanded material layer. The non-expanded material layer was then laminated on one surface of the expanded material layer. The results of evaluation of the laminate are set forth in Table 6.

COMPARATIVE EXAMPLE 8

Polymer C was used as an expanded material layer. Polymer E was used as a non-expanded material layer. The non-expanded material layer was then laminated on one surface of the expanded material layer. The results of evaluation of the laminate are set forth in Table 6.

COMPARATIVE EXAMPLE 9

Polymer M was used as an expanded material layer.

Polymer M was also used as a non-expanded material layer. The non-expanded material layer was then laminated on one surface of the expanded material layer. The results of evaluation of the laminate are set forth in Table 6.

COMPARATIVE EXAMPLE 10

Polymer N was used as an expanded material layer. Polymer N was also used as a non-expanded material layer. The non-expanded material layer was then laminated on one surface of the expanded material layer. The results of evaluation of the laminate are set forth in Table 6.

TABLE 4

| Example No. | Print test | Heat resistance test | Impact resistance test (A method) | Impact resistance test (B method) | Storage stability test | Bio-degrad-ability test |
|---|---|---|---|---|---|---|
| 27 | 1 | 2 | 1 | 2 | 3 | 1 |
| 28 | 1 | 1 | 1 | 2 | 3 | 1 |
| 29 | 1 | 2 | 1 | 1 | 3 | 1 |
| 30 | 1 | 2 | 1 | 1 | 2 | 1 |
| 31 | 2 | 1 | 1 | 1 | 2 | 1 |
| 32 | 2 | 1 | 1 | 1 | 2 | 1 |
| 33 | 1 | 1 | 1 | 1 | 1 | 1 |
| 34 | 1 | 2 | 1 | 2 | 1 | 1 |
| 35 | 1 | 2 | 1 | 2 | 1 | 1 |
| 36 | 2 | 1 | 1 | 1 | 1 | 1 |
| 37 | 1 | 1 | 1 | 1 | 1 | 1 |

TABLE 5

| Example No. | Print test | Heat resistance test | Impact resistance test (A method) | Impact resistance test (B method) | Storage stability test | Bio-degrad-ability test |
|---|---|---|---|---|---|---|
| 38 | 1 | 2 | 1 | 2 | 1 | 1 |
| 39 | 1 | 2 | 1 | 2 | 2 | 1 |

TABLE 6

| Comparative Example No. | Print test | Heat resistance test | Impact resistance test (A method) | Impact resistance test (B method) | Storage stability test | Bio-degrad-ability test |
|---|---|---|---|---|---|---|
| 6 | 1 | 3 | 4 | 4 | 4 | 1 |
| 7 | 4 | 2 | 1 | 1 | 3 | 1 |
| 8 | 4 | 3 | 3 | 3 | 3 | 1 |
| 9 | 1 | 2 | 3 | 3 | 4 | 1 |
| 10 | 1 | 3 | 4 | 4 | 4 | 1 |

The present invention provides a biodegradable expanded material having excellent expandability, moldability, impact resistance, heat resistance and storage stability. The present invention also provides a process for the preparation of the foregoing expanded material. The present invention further provides a laminate of a non-expanded material layer and an expanded material layer prepared from the foregoing expanded material which exhibits excellent impact resistance and heat resistance and an excellent transparency in the non-expanded material even after heat treatment so that a pattern printed on the inner side of the non-expanded material layer can be clearly viewed from the outside.

While the invention has been described in detail and with reference to specific embodiments thereof, it will be apparent to one skilled in the art that various changes and modifications can be made therein without departing from the spirit and scope thereof.

What is claimed is:

1. A laminate comprising an expanded material layer made of an expanded material and a biodegradable non-expanded material layer said expanded material being made of a hydroxycarboxylic acid based polyester having a weight-average molecular weight of from 20,000 to 400,000 comprising as structural units a structural unit derived from a hydroxycarboxylic acid, selected from the group consisting of glycolic acid, 3-hydroxybutyric acid, 3-hydroxyvaleric acid, L-lactic acid, D-lactic acid, meso-lactic acid ε-caprolactone and mixtures thereof, a structural unit derived from molecular weight increasing agent and/or a structural unit derived from polymerization catalyst deactivator.

2. The laminate according to claim 1, wherein said non-expanded material layer is made of said expanded material.

3. The laminate according to claim 1, wherein said non-expanded material layer is made of a lactic acid based polyester having a weight-average molecular weight of from 20,000 to 400,000 comprising from 40 to 95 parts by weight of a structural unit derived from lactic acid and from 5 to 60 parts by weight of a polyester structural unit derived from dicarboxylic acid and diol.

4. The laminate according to claim 1, wherein said non-expanded material layer comprises a structural unit derived from lactic acid and a polyester structural unit derived from dicarboxylic acid and diol and a part or whole of said polyester structural unit derived from dicarboxylic acid and/or diol has a $C_{1-10}$ alkyl branched chain.

5. The laminate according to claim 1, wherein said non-expanded material layer is in the form of a crystal formed by heat treatment at a temperature of from not lower than its glass transition temperature to lower than its melting point.

6. A laminate comprising an expanded material layer made of an expanded material and a biodegradable non-expanded material layer, said expanded material being made of a hydroxycarboxylic acid based polyester having a weight-average molecular weight of from 20,000 to 400,000 comprising as structural units a structural unit derived from a hydroxycarboxylic acid selected from the group consisting of glycolic acid, 3-hydroxybutyric acid, 3-hydroxyvaleric acid, L-lactic acid, D-lactic acid, meso-lactic acid ϵ-caprolactone and mixtures thereof, a structural unit derived from molecular weight increasing agent and/or a structural unit derived from polymerization catalyst deactivator, a structural unit derived from dicarboxylic acid, and a structural unit derived from diol.

7. The laminate according to claim 6, wherein said non-expanded material layer is made of said expanded material.

8. The laminate according to claim 6, wherein said non-expanded material layer is made of a lactic acid based polyester having a weight-average molecular weight of from 20,000 to 400,000 comprising from 40 to 95 parts by weight of a structural unit derived from lactic acid and from 5 to 60 parts by weight of a polyester structural unit derived from dicarboxylic acid and diol.

9. The laminate according to claim 6, wherein said non-expanded material layer comprises a structural unit derived from lactic acid and a polyester structural unit derived from dicarboxylic acid and diol and a part or whole of said polyester structural unit derived from dicarboxylic acid and/or diol has a $C_{1-10}$ alkyl branched chain.

10. The laminate according to claim 6, wherein said non-expanded material layer is in the form of a crystal formed by heat treatment at a temperature of from not lower than its glass transition temperature to lower than its melting point.

11. The expanded material according to claim 1, wherein said structural unit derived from hydroxycarboxylic acid is one derived from lactic acid.

12. The expanded material according to claim 1, wherein said structural unit derived from polymerization catalyst deactivator comprises a chelating agent and/or acidic phosphate component.

13. The expanded material according to claim 6, wherein said structural unit derived from hydroxycarboxylic acid is one derived from lactic acid.

14. The expanded material according to claim 6, wherein said structural unit derived from polymerization catalyst deactivator comprises a chelating agent and/or acidic phosphate component.

* * * * *